(12) United States Patent
Shear

(10) Patent No.: US 11,209,784 B1
(45) Date of Patent: *Dec. 28, 2021

(54) SMART GRID CONTROLLER

(71) Applicant: Dan Shear, Olympia, WA (US)

(72) Inventor: Dan Shear, Olympia, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,647

(22) Filed: Apr. 5, 2021

Related U.S. Application Data

(63) Continuation-in-part of application No. 17/006,615, filed on Aug. 28, 2020, now Pat. No. 10,969,758.

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
None
See application file for complete search history.

(56) References Cited

U.S. PATENT DOCUMENTS

| | | | |
|---|---|---|---|
| 4,744,028 A | 5/1988 | Karmarkar | |
| 8,556,267 B2 | 10/2013 | Gobush | |
| 8,718,850 B2 | 5/2014 | Bozchalui et al. | |
| 2005/0107892 A1* | 5/2005 | Matsui | H02J 3/38 700/28 |
| 2008/0134193 A1 | 6/2008 | Corley | |
| 2008/0215409 A1 | 9/2008 | Van Matre | |
| 2013/0103223 A1* | 4/2013 | Liebel | G05B 13/02 700/296 |
| 2014/0018971 A1* | 1/2014 | Ellis | G06Q 10/04 700/297 |
| 2014/0334927 A1 | 11/2014 | Hammerum | |
| 2015/0019038 A1 | 1/2015 | Kouroussis et al. | |
| 2016/0077507 A1 | 3/2016 | Sheble | |
| 2016/0105023 A1 | 4/2016 | De Ridder et al. | |

(Continued)

FOREIGN PATENT DOCUMENTS

EP 356173 A2 2/1990

OTHER PUBLICATIONS

Xue et al., An interactive building power demand management strategy for facilitating smart grid optimization, Applied Energy, 2014, pp. 297-310, vol. 116.

(Continued)

*Primary Examiner* — Jason Lin
(74) *Attorney, Agent, or Firm* — Patterson + Sheridan LLP

(57) ABSTRACT

Certain aspects of the present disclosure provide a method, including determining a plurality of constraints for a system in a first format wherein at least one constraint of the plurality of constraints comprises a discrete constraint associated with a discrete variable; converting the plurality of constraints in the first format into a set of formatted constraints in a second format; determining a near feasible solution that satisfies a first subset of formatted constraints of the set of formatted constraints; determining an optimal solution by performing an optimization technique on the near feasible solution based on the first subset of formatted constraints; converting the optimal solution of the first subset of formatted constraints into an optimal solution of the plurality of constraints in the first format; and implementing the optimal solution within the system.

20 Claims, 10 Drawing Sheets

(56) References Cited

U.S. PATENT DOCUMENTS

| | | |
|---|---|---|
| 2017/0161411 A1 | 6/2017 | Meneghin |
| 2018/0158152 A1 | 6/2018 | Jereminov et al. |
| 2019/0311306 A1 | 10/2019 | Peterson |
| 2020/0082422 A1 | 3/2020 | Sun |
| 2020/0202459 A1 | 6/2020 | Chow |

OTHER PUBLICATIONS

Ranganathan et al., Distributed Linear Programming Models in a Smart Grid (Power Electronics and Power Systems), 2017, Springer.

Mansor et al., Optical Scheduling of Dynamic energy Demand in Smart Grid Using Time-slotting Linear Programming, 2019, IEEE, pp. 1-5.

Asad et al., On the use of Matroid Theory for Distributed Cyber-Physical-Constrained Generator Scheduling in Smart Grid, Jan. 2, 2016, IEEE Transactions on Industrial Electronics, vol. 62, No. 1, pp. 299-209, 2015/.

* cited by examiner

200
Convert constraints of the first format to second format:

$\vec{a} \cdot \vec{x} \geq b$ converts to $\vec{a}' \cdot \vec{x} \geq 0$ where $\vec{a}'$ is $\vec{a}$ appended with $-b$.
$\vec{a} \cdot \vec{x} \leq b$ converts to $\vec{a}' \cdot \vec{x} \geq 0$ where $\vec{a}'$ is $-\vec{a}$ appended with $b$.

$\vec{a} \cdot \vec{x} = b$ converts to two constraints:

$\vec{a}' \cdot \vec{x} \geq 0$ where $\vec{a}'$ is $\vec{a}$ appended with $-b$ and
$\vec{a}' \cdot \vec{x} \geq 0$ where $\vec{a}'$ is $-\vec{a}$ appended with $b$.

230 Normalize second format vectors.

240 $\vec{c}'$ the benefit vector in the second format is the first format benefit vector $\vec{c}$ appended with 0.

250 Add $s\vec{POS} \cdot x \geq 0$ to second format constraints to assure that $S_{variable} \geq 0$

260 Calculate $\vec{\bar{a}}$ average of top priority $\vec{a}'(i)$

270 Calculate principal components of the matrix $A'$
where $A'(i) = \vec{a}'(i) - \vec{\bar{a}}$ for all $\vec{a}'(i)$ that are top priority constraints
sort by absolute value of $S_{variable}$ of the principal component vectors

280 Choose initial near feasible solution $\vec{nf}$ to be the vector yielding most top priority good constraints among 1) normalized $\vec{\bar{a}}$, 2) weighted average direction, 3) top few principal component and 4) prior solutions if known

FIG. 2

SMART GRID CONTROLLER

CROSS-REFERENCE TO RELATED APPLICATIONS

This Application is a continuation-in-part of co-pending U.S. patent application Ser. No. 17/006,615, filed Aug. 28, 2020, the entire contents of which are incorporated herein by reference.

INTRODUCTION

Aspects of the present disclosure relate to efficient control of smart electric power grids.

Power grids used to comprise tree-like networks of power stations and user controlled simple terminals. By contrast, the modern smart power grid (the grid) is a complex interactive network. The grid includes peripheral generating stations, power storage elements, peripheral control and sensor devices, and multiple priorities of users.

Operations research is the endeavor to allocate resources in a practical and efficient way to operate complex systems. Linear programming is the sub-field of operations research dedicated to systems that can be modeled by linear equations. That is, the constraints and benefits can be adequately expressed as linear equations of the allocated resources.

Linear programming techniques have been used for the control and operation of various types of systems. However, the existing linear programming methods are geared to obtaining an optimal solution (e.g., maximizing benefit) by modifying a known solution of the linear equations. Unfortunately, sometimes a starting solution is not available and may not even exist. For example, in the case of an electric grid, it is possible for excessive consumer demands to exceed power production capacity. In such a case, existing techniques of linear programming may loop indefinitely or fail without a satisfactory explanation of the cause of failure.

Moreover, in many cases, a grid's constraints are local so that in the system of equations representing the grid, most variables have zero-valued coefficients. The result is massive equations that are very sparse (many coefficients are zero), which renders current methods that rely on matrix inversions both inefficient and error prone (e.g., due to round off errors).

Accordingly, the control and operation of grids remains a difficult problem because of the massive number of network elements, the sparsity of the interaction of those elements, and the possibility that there is no solution that satisfies all constraints. Accordingly, methods and systems are needed to address the shortcoming of existing control schemes.

BRIEF SUMMARY

Certain aspects provide a method, including determining a plurality of constraints for a system in a first format wherein at least one constraint of the plurality of constraints comprises a discrete constraint associated with a discrete variable; converting the plurality of constraints in the first format into a set of formatted constraints in a second format, including converting the discrete constraint into a plurality of constraints in the second format comprising inequalities bounding a value of the discrete variable along a continuous segment between two integer values; determining a near feasible solution that satisfies a first subset of formatted constraints of the set of formatted constraints; determining an optimal solution by performing an optimization technique on the near feasible solution based on the first subset of formatted constraints; converting the optimal solution of the first subset of formatted constraints in the second format into an optimal solution of the plurality of constraints in the first format; and implementing the optimal solution within the system.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of one or more embodiments and are therefore not to be considered limiting of the scope of this disclosure.

FIG. 2 depicts the creation of the internal second format representation.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
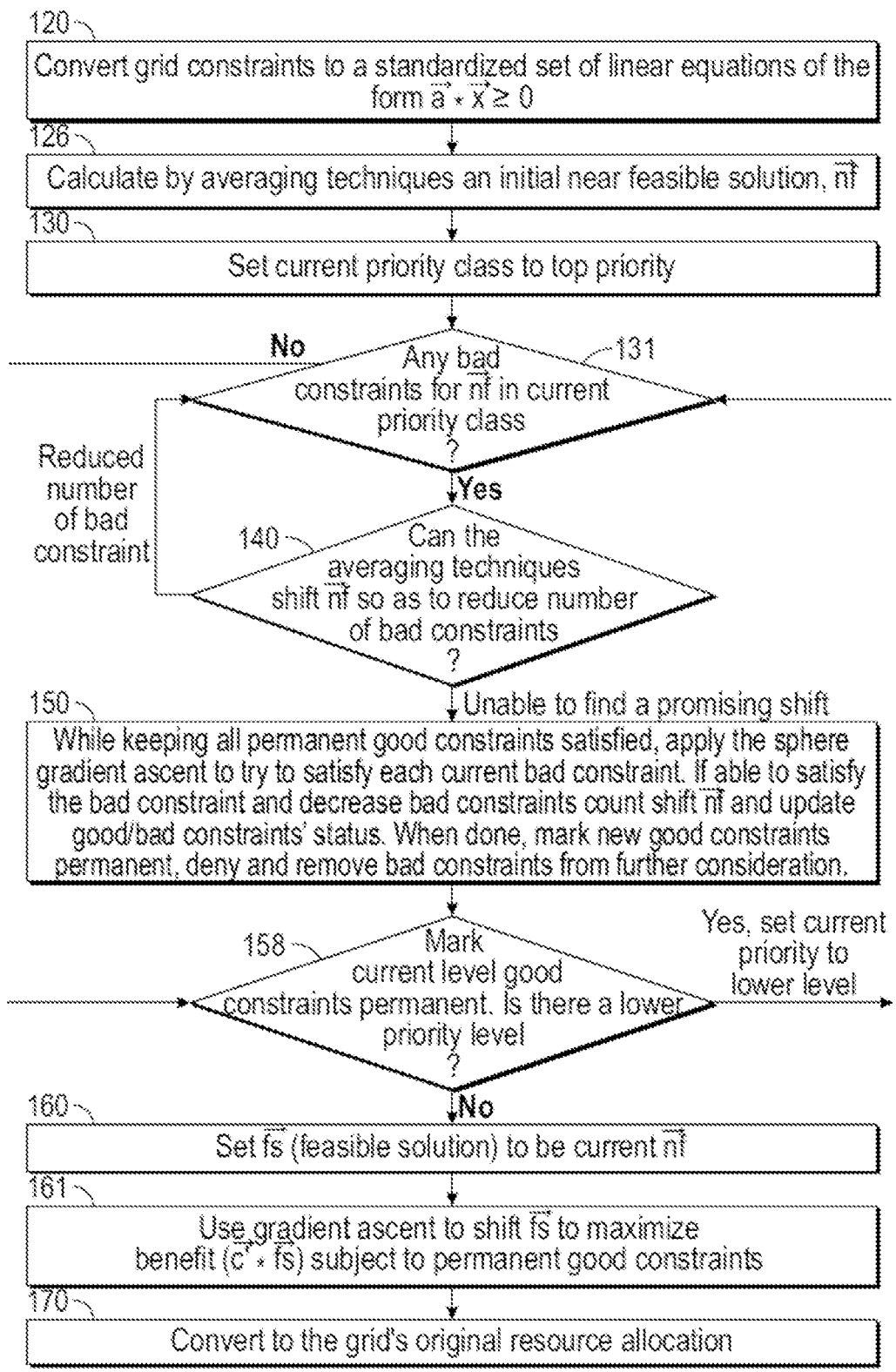
FIG. 1 depicts an overview of the disclosure.

Aspects of the present disclosure provide apparatuses, methods, processing systems, and computer-readable mediums for efficiently controlling a complex interactive systems utilizing linear programming.

Embodiments of the systems and methods described herein may be configured, for example, to control aspects of an electric power grid, including managing the output of traditional main power stations as well as intermittent peripheral power generation devices, power storage devices, peripheral sensors, and peripheral grid control devices. In particular, the systems and methods described herein may be configured to use the grid resources to effectively match power supply by various power producers with power demand by various consumers while minimizing costs and maximizing stakeholder benefits. Notably, while control of a power grid is used as an example use case throughout, the methods and systems described herein may be used in the context of any sort of complex optimization problem, such as those generally addressed with linear programming methods.

Brief Background on Linear Programming and the Solution Algorithms

Linear programming was developed to control complex systems that operate under constraints that can be represented as linear equations. Generally, a linear equation representing such a constraint compares a known scalar to the sum of known constant coefficients multiplied by unknown variables. At a point of time, external uncontrollable conditions determine these known constants, which may vary in time. The unknown variables represent a controllable resource allocation value in response to the external conditions at a given time.

In one example, the known constant coefficients may be written as a vector $\vec{a}$, the unknown variables representing the unknown resource allocations may be written as a vector $\vec{x}$, and the scalar may be written as b. Then an equation may be written as either $\vec{a}*\vec{x}=b$, $\vec{a}*\vec{x}\leq b$, or $\vec{a}*\vec{x}\geq b$. The vector $\vec{x}$ is said to satisfy a constraint if the equation representing that constraint and relating $\vec{a}*\vec{x}$ and b is true. A feasible solution is thus a vector that satisfies all constraints. Accordingly, operating a system with resources allocated according to a feasible solution will satisfy all the constraints of the system.

Linear programming also uses a linear benefit function. That is, there is a known vector $\vec{c}$ of constants such that $\vec{c}*\vec{x}$ is the measure of the benefit of operating the system with the resource allocations represented by $\vec{x}$. Generally, the objective for linear programming is to calculate an optimal feasible solution vector that maximizes the benefit function.

If the number of allocable resources is $var_{count}$, then a feasible solution vector $\vec{fs}$, representing a resource allocation is a vector in a $var_{count}$-dimensional linear space. When implemented by a digital processing system (e.g., as a computer program), $\vec{fs}$ may be an array of $var_{count}$ floating point numbers (variables), each representing a controllable resource allocation choice. When there are $eq_{count}$ known constraints, then there may be a set A of known vectors $\vec{a}(i) i \in \{1, \ldots, eq_{count}\}$, where each $\vec{a}(i)$ is of the same dimension as $\vec{fs}$. Further, $\vec{b}$ may be a vector of $eq_{count}$ real numbers.

Generally, there are $eq_{count}$ linear equations relating $\vec{a}(i)*\vec{fs}$ and $\vec{b}(i)$, and each equation is either an equality or inequality representing a constraint. $\vec{fs}$ satisfies a constraint if and only if the equation representing that constraint is true. All of these equations must be true for a feasible solution $\vec{fs}$. There is also a known benefit vector $\vec{c}$ of the same dimension as $\vec{fs}$ and the goal is to find an optimal feasible solution that maximizes a benefit function $\vec{c}*\vec{fs}$.

Solving a linear system of equations composed only of equalities by variable elimination and substitution or triangulation is possible. However, until the development of the simplex algorithm, there were no practical algorithms to find an optimal feasible solution to large linear programming equation systems that included inequalities.

The simplex algorithm is one approach for optimizing systems modeled by linear equations. The simplex algorithm is based on the observation that the set of feasible solutions of a system of linear equations is a convex polytope in the $var_{count}$ space. That set of feasible solutions is formed by the intersection of each hyperplane satisfying each equality and the half-spaces satisfying each inequality (the appropriate side of the hyperplane). The simplex algorithm iteratively moves along the envelope of that convex polytope from vertex to vertex. The direction of the move along the envelope is determined by trading one critical constraint for another, searching for improved performance. It is mathematically proven that if there is a finite optimum (e.g., if the system is bounded), it will be in a vertex. The simplex algorithm moves along the vertices, eventually finding an optimum unless there is an unusual redundancy.

The simplex algorithm works best in modifying a known feasible solution that satisfies the constraints by gradually reallocating resources to increase benefit. However, when there is no known feasible solution, the algorithm may fail without a definite explanation. Also, moving along the envelope of feasible solutions from vertex to vertex means that computational (round off) errors may accumulate and result in a violation of constraints. These issues can be compounded when there is redundancy of the presentation of constraints in a large system.

A second approach for solving and optimizing linear programming models is the ellipsoid method. Although theoretically more definite, the ellipsoid method performs more slowly than the simplex method and is not in general use.

A third approach for solving and optimizing linear programming models proceeds from a feasible internal solution to a near optimal solution by shifting that solution towards and along the margin of the convex polytope, defined by the constraints so as to iteratively increase the linear benefit function as described in U.S. Pat. No. 4,744,028. This approach also starts with a feasible solution, which is often not known a priori, thus greatly limiting its applicability. Further, this approach has trouble handling unbounded conditions and involves iterative matrix inversions with cumulative round off errors and computational costs for large systems.

Further, these and other conventional approaches are unable to detect and handle unsolvable (inconsistent) inequalities and do not terminate with a useful result in such cases. Thus, improved approaches are needed.

Aspects of Controlling an Electric Grid Using Linear Programming Methods

Control of an electric grid aims at efficiently allocating resources to satisfy constraints imposed by the available hardware limitations while meeting the constraints imposed by the system's stakeholders' needs, such as the power that consumers demand. At a point of time, linear equations can represent the constraints and the benefit of the grid, and the constant coefficients of the linear equations represent known but uncontrollable conditions, such as the available power supply of production units and demand of customers, power line transmission limits, etc. The variables represent the controllable allocation of resources such as actual power production and transmission in response to the uncontrollable coefficients of the linear equations at a given point of time. Hence, linear programming applications for a smart grid are geared for efficient instantaneous control of the grid. Long-term planning and modeling of grids is nonlinear, yet linear programming may assist in calculating the grid's resources allocations and benefit in response to simulated situations.

Conventional linear programming approaches, such as those described above, are not designed to handle prioritization of constraints when no global feasible solution is available. The current art of linear programming works best when it starts from a feasible solution searching for an optimal solution. However, when the current art starts without being given a feasible solution, it sometimes fails and returns a non-specific error message. This failure may be due either to numerical convergence issues or results from inconsistent constraints. In either case, this renders conventional solutions unfit for controlling essential services, like electric grids.

Notably, electric grids sometimes are unable to satisfy all constraints (such as excessive consumer demands or line failures). In such cases, the controller must act immediately to shut down part of the grid, thereby excluding some constraints in order to preserve grid integrity and to prevent extensive power failures or dangerous conditions. Since these inconsistent constraints must be managed and the existing art of linear programming has no mechanism to pinpoint the source of inconsistencies, conventional solutions are deficient when managing electric power grids and other similarly complex systems.

By contrast, the methods described herein do not need to start from a feasible solution and are designed to find inconsistent constraints if any exist. Beneficially, this allows for management of these inconsistencies. For instance, if an inconsistent constraint represents users' demand, it may be disabled temporarily to protect the grid's hardware and to efficiently satisfy other constraints.

Further, embodiments described herein may utilize constraints with various priority levels. For example, constraints representing consumer demands generally have lower priorities than constraints that assure the grid's compliance with system hardware limitations. This means that certain system stakeholders may be cut off temporarily and their demands may be left unfulfilled to preserve the grid.

Further, not all consumers of electric power are equal. For instance, a steel or aluminum production facility may prefer a cheap, though intermittent, power supply. On the other hand, computer server facilities may require a highly reliable power supply even if it costs more. Similarly, in a high-rise office building, a short interruption of the air conditioner system will be a minor nuisance, but a power interruption to lighting, elevators, or office equipment is a major event. So-called "smart" electric grids are evolving to take advantage of these types of choices.

Improvements Over Conventional Linear Programming Approaches

When conventional linear programming returns a solution, it is on the vertex of the envelope of feasible solutions. As a result, there is no margin of error. Numerical round-off errors that, by necessity, accumulate with digital arithmetic operations involving many floating point numbers may render such a solution in violation of constraints. The serial application of matrix inversions in conventional solutions compounds the numerical errors. For example, U.S. Pat. No. 8,556,267 describes the numerical round-off issues but still relies on cumulative serial matrix reversal operations.

Accordingly, the systems and methods described herein improve upon conventional methods in both the ability to find a feasible solution when none is given, handling of constraints that are impossible to satisfy, and compensating for numerical round off errors.

Unlike conventional approaches, embodiments described herein start by either finding an operating state that satisfies the constraints, or by showing that the constraints are inconsistent. Inconsistent equations that represent low priority constraints that can be denied automatically are denied automatically so as to identify a working system (e.g., grid) for satisfying the rest. In either case an alert as to the inconsistency of these constraints for manual evaluation is issued. Thus, in the context of a grid, the methods described herein improve on existing linear programming methods by finding a solution that satisfies the existing constraints for as many consumers as possible and then optimizes the overall benefits of the system. In some embodiments, this is done by solving the equations directly, locating inconsistent low priority equations, and eliminating them to get a solution. That solution is then modified to optimize a benefit function while satisfying those equations that can be satisfied simultaneously.

Unlike conventional approaches, embodiments described herein are numerically stable because they do not run "on the edge" like, for example, the conventional simplex based approach; rather, they maintain a margin of "safety" from the limit imposed by the constraints. Beneficially, unlike existing linear programming approaches that hit a dead end if there is no solution that satisfies all constraints, the methods described herein will find a solution that satisfies as many constraints as possible.

Further, unlike conventional techniques, embodiments described herein allow for several priority classes. This allows for higher priority constraints to generally be satisfied before lower priority constraints are addressed and avoids the dead end of conventional techniques.

Computationally, embodiments described herein do not rely on multiple matrix inversions; rather, they rely on vector additions and multiplications. These vector operations are efficient for the sparse system where the sparse vectors are stored as a list of the non-zero elements. For example, many of the vectors $\vec{a}(i)$ represent constraints involving a few local control variables and have a zero multiplier for most control variables that involve remote parts of the grid; hence, these vector operations enhance computation performance. With such data structures, the storage requirements and computation time of addition and multiplication of such sparse vectors are linear functions of the number of non-zero elements. Thus, the computational complexity of the embodiments described herein are linear with the number of non-zero elements, which is advantageous for sparse data. The methods described herein will be processed more quickly by computer processing hardware due to their complexity advantage compared to conventional methods.

Overview of a Controller for a Smart Electric Grid Represented by a Linear System (FIG. 1)

FIG. 1 depicts an overview of a control strategy for a complex system, such as a smart electric power grid. As above, a grid may be represented in a control system, such as those described herein, as a set of linear equations representing the constraints on the resources and a linear benefit of the allocated resources. For example, controllable resources include power transmission in a power line, power generation in a production unit, and power transfer to or from storage devices. Examples of constraints include power line transmission limits, current production unit capacity limits (which may vary in time), power storage elements' capacity and status, current consumers' power requirements, and others. The systems and methods described herein thus provide for efficient computation of a solution to the constraints and an optimization of grid utility.

In various embodiments, the objective is to calculate an unknown (e.g., not known a priori) optimal feasible solution vector. As above, a feasible solution vector $\vec{fs}$ represents a resource allocation, where $\vec{fs}$ is a vector in the $\text{var}_{count}$-dimensional linear space. Further, there is a set A of $\text{eq}_{count}$ known vectors $\vec{a}(i)$ $i \in 1, \ldots, \text{eq}_{count}$, where each $\vec{a}(i)$ is of the same dimension as $\vec{fs}$. Further, $\vec{b}$ is a vector of $\text{eq}_{count}$ real numbers. There are $\text{eq}_{count}$ linear equations relating $\vec{a}(i)*\vec{fs}$ and $\vec{b}(i)$. Each equation is either an equality or inequality representing a constraint. $\vec{fs}$ satisfies a constraint if and only if the equation representing that constraint is true. All of these equations must be true for a feasible solution, $\vec{fs}$. There is also a known benefit vector $\vec{c}$ of the same dimension as $\vec{fs}$ and the goal is to find an optimal feasible solution that maximizes a benefit function $\vec{c}*\vec{fs}$.

FIG. 1 begins at step 120 with the conversion of the constraints expressed as linear equations, $\vec{a}(i)*\vec{x} \geq b(i)$ and/or $\vec{a}(i)*\vec{x}=b(i)$ for $\vec{a}(i) \in A$ into a second format $\vec{a}'(i)*\vec{x}' \geq 0$ where $\vec{a}'(i) \in A'$ and $\|\vec{a}'\|=1$. Simultaneously, the benefit function $\vec{c}*\vec{x}$ is converted to $\vec{c}'*\vec{x}'$ where $\|\vec{c}'\|=1$. A constraint $\vec{a}'(i)$ in this second format is satisfied by $\vec{x}$ if $\vec{c}*\vec{x} \geq 0$.

Next, as depicted in FIG. 1 step 126, the grid controller obtains an initial approximated solution that satisfies many of the constraints. The approximated solution may be referred to as a "near feasible" solution $\vec{nf}$. Generally, $\vec{nf}$ is either an average of all (or some subset of) the $\vec{a}'(i)$'s or a prior solution of the grid under similar circumstances, if known.

FIG. 1 step 130 depicts that the controller next processes top (or high) priority constraints by setting the current priority to be top priority.

FIG. 1 step 131 depicts that if any of the constraints of the current priority is unsatisfied, it is labeled a bad constraint and an attempt to shift the near feasible solution so as to satisfy these bad constraints will commence.

FIG. 1 step 140 depicts that next the grid controller may shift the near feasible solution in several directions in attempt to satisfy multiple bad constraints simultaneously.

FIG. 1 step 150 depicts that if there are bad constraints left, then the grid controller attempts to find a shift of the near feasible solution that will satisfy each bad constraint one at a time while keeping the current satisfied (good) constraints satisfied.

FIG. 1 step 158 depicts that when all bad constraints of the current level are processed, then the currently satisfied constraints are marked permanent good constraints and the bad constraints are denied as inconsistent.

Next, if there is a lower priority level of constraints, then the grid controller processes the next lower priority level of constraints, otherwise the grid controller proceed to maximize (optimize) the benefit function.

As depicted in FIG. 1 step 150, the grid controller may deny constraints that are inconsistent with a plurality of other constraints (for example by remotely turning off a portion of the grid in case of excessive consumer demand).

FIG. 1 step 160 depicts that when the grid controller finishes processing all priority levels it has a feasible solution, $\vec{fs}'$ satisfying the constraints that were not denied. The denied constraints may be available for external evaluation. Further calculations of the grid controller involve only the constraints that were not denied.

As depicted in FIG. 1 step 161, next the grid controller may further iteratively shift $\vec{fs}'$ (the feasible solution) by reassigning the resources to increase the benefit function. The result of this shifts $\vec{fs}'$ will be a near optimal feasible solution when converted back the original (first) format.

As depicted in FIG. 1 step 170, finally, the grid controller may convert $\vec{fs}'$, the feasible solution in the second format, into a feasible solution $\vec{fs}$ in the original (first) format. Thus, $\vec{fs}$ represents an optimal resource allocation for the grid, which maximizes the benefit function $\vec{c}*\vec{x}$ over all feasible solutions.

Thus, embodiments described herein are configured to enable real-time calculation of a feasible solution that accounts for the physical limitations of the underlying system (e.g., an electric power grid), numerical limitations of the underlying hardware (e.g., computer processors), and the limited precision of the estimate of the system's constraints. As above, embodiments described herein are particularly efficient because they rely on vector addition and multiplication operations that are efficient on sparse data, such as the data representing the various elements of an electric grid.

The following describes an example of multi-step processing flow.

Step 1: Creating a Grid Representation as a Standardized Set of Linear Constraints (FIG. 2)

FIG. 2 depicts Step 1, wherein a complex system such as an electric power grid, represented as a set of constraints expressed in a first format as linear equations: $\vec{a}(i)*\vec{x} \geq b(i)$, $\vec{a}(i)*\vec{x}=b(i)$, and/or $\vec{a}(i)*\vec{x} \leq b(i)$ (equalities and inequalities), with a benefit function $\vec{c}*\vec{x}$ is transformed into a second format. The second format (also named standard form) is also a linear system of equations where a solution $\vec{x}'$ must satisfy: $\vec{a}'(i)*\vec{x}' \geq 0$, where $\vec{a}'(i) \in A'$ for $i \in \{1, \ldots, \text{eq}_{count}\}$ such that $\vec{a}'(i)$ are unit vectors ($\|\vec{a}'(i)\|=1$). Further, $\vec{c}$ of the benefit function $\vec{x}*\vec{c}$ is converted to which is also a unit vector.

FIG. 2 step 200 depicts the transformation of an inequality $\vec{a}(i)*\vec{x} \geq b(i)$, into the second format in two steps. The first step appends the scalar $-b(i)$ to the vector $\vec{a}(i)$ to create $\vec{a}'(j)$, a vector of one higher dimension. The corresponding first step for $\vec{a}(i)*\vec{x} \leq b(i)$, is to append $b(i)$ to the vector $-\vec{a}(i)$ to create the corresponding $\vec{a}'(j)$. A solution vector $\vec{x}$ of the first format of the original grid is transformed to $\vec{x}'$, a vector in one higher dimension by appending the value 1 to to $\vec{x}$, 1 as a new last value. This ensures that for $\vec{a}'(i)*\vec{x}'$, 1 is the multiplier of the appended element of $\vec{a}'(i)$. The number in the appended dimension of $\vec{x}'$ can be thought of as a new variable representing an artificial resource allocation and will be referred to as the $s_{variable}$.

FIG. 2 step 230 completes the transformation, all $\vec{a}'(i)$ in A' are normalized to be unit vectors. $\vec{c}'$ is also normalized.

An equality $\vec{a}(i)*\vec{x}=b(i)$ is equivalent to $\vec{a}(i)*\vec{x}-b(i)=0$ and that equality is equivalent to the two inequalities: $\vec{a}(i)*\vec{x}-b(i)\geq 0$ and $-\vec{a}(i)*\vec{x}+b(i)\geq 0$. Thus, the original constraint that was represented by an equality is represented by two inequality equations in second format, thereby increasing the number of equations so that the set A' may have more vectors than the set A. The two inequality equations have the same priority as the original equality equation and are cross-referenced so that, for example, if one is eventually denied and removed from further consideration, the other will be denied too.

Equalities raise numerical issues in large systems as they require some tolerance of numerical round off error. For example, ε may be a small positive value based on the underlying precision of the digital device and used as the tolerance for numerical errors in the underlying grid representation. Accordingly, the equality $\vec{a}(i)*\vec{x}-b(i)=0$ is actually replaced by two relaxed inequalities: $\vec{a}(i)*\vec{x}-b(i)+\in\geq 0$ and $-\vec{a}'(i)*\vec{x}+b(i)+\in\geq 0$. In other words, ε relaxes the equality constraint to allow for tolerance of round off errors in the numerical calculations. If the engineering tolerances for any constraint exceed ε, it may be individually more relaxed.

FIG. 2 step 240 depicts that the second format benefit vector $\vec{c}'$ is $\vec{c}$ with 0 appended as the last value in the vector so that $\vec{x}'*\vec{c}'=\vec{x}*\vec{c}$.

FIG. 2 step 250 depicts that the grid controller keeps the artificial resource, the $s_{variable}$, positive to allow conversion back to the original resource allocations (the first format). For this reason, an additional equation is added to A' to force the new variable to be non-negative. The vector of that equation will be referred to as $\overrightarrow{sPOS}$ and will have 0 in all elements except for 1 in the $s_{variable}$ position; so that $\overrightarrow{sPOS}*\vec{x}'\geq 0$ requires the $s_{variable}$ to be non-negative. If $s_{variable}$ is positive, then dividing a solution by its value will preserve the direction of inequalities and allow conversion of a solution $\vec{x}$ to the original resource allocation by truncating the last element that will be 1 after the division. Accordingly, $s_{variable}$ has to be strictly positive to allow conversion back to the original constraints.

In some embodiments, to prevent excessive errors, $s_{variable}$ is required to be greater than ε1, a small positive number. For example, on a digital computer with floating numbers approximated with 64 bit representations, when dealing with hundreds of variables and constraints, ε1 on the order of $10^{-4}$ is adequate, though other examples are possible. This small tightening (1 part in 10,000) is tolerated well in most situations. Here, and in other occasions because of numerical issues related to round off errors, numbers whose absolute value is less than ε1 are treated as zero. Avoiding round off issues by requiring that $S_{variable}\geq\varepsilon 1$ disallows some marginal but otherwise feasible solutions where $0<S_{variable}<\varepsilon 1$, thereby slightly tightening the space of feasible solutions. This tightening typically has an insignificant effect on the ultimate benefit achieved by the optimal feasible solution of the grid. This is particularly the case because in other places, numerical round off considerations expand (relax) the space of feasible solution. Such was the case earlier when the conversion of equalities of the first format to inequalities of the second format expanded (relaxed) the space of feasible solutions to accommodate round off errors by tolerating solutions that were closer than E to the underlying equalities.

Step 2: Finding a Feasible Solution Satisfying Constraints by Priorities

FIG. 1 step 126 depicts that Step 2 starts by finding an initial near feasible solution using averaging methods. That initialization is depicted in more details in FIG. 2 steps 260, 270, and 280. Step 2 next modifies the near feasible solution to satisfy more constraints. Step 2 starts with satisfying additional constraints of the highest priority and then satisfying constraints of lower priority. The processing of each priority level may be considered two sub-steps: 2A and 2B. These sub-steps shift the near feasible solution so it does satisfy more constraints of the current priority level while keeping the higher priority level constraints satisfied.

Figure 3:
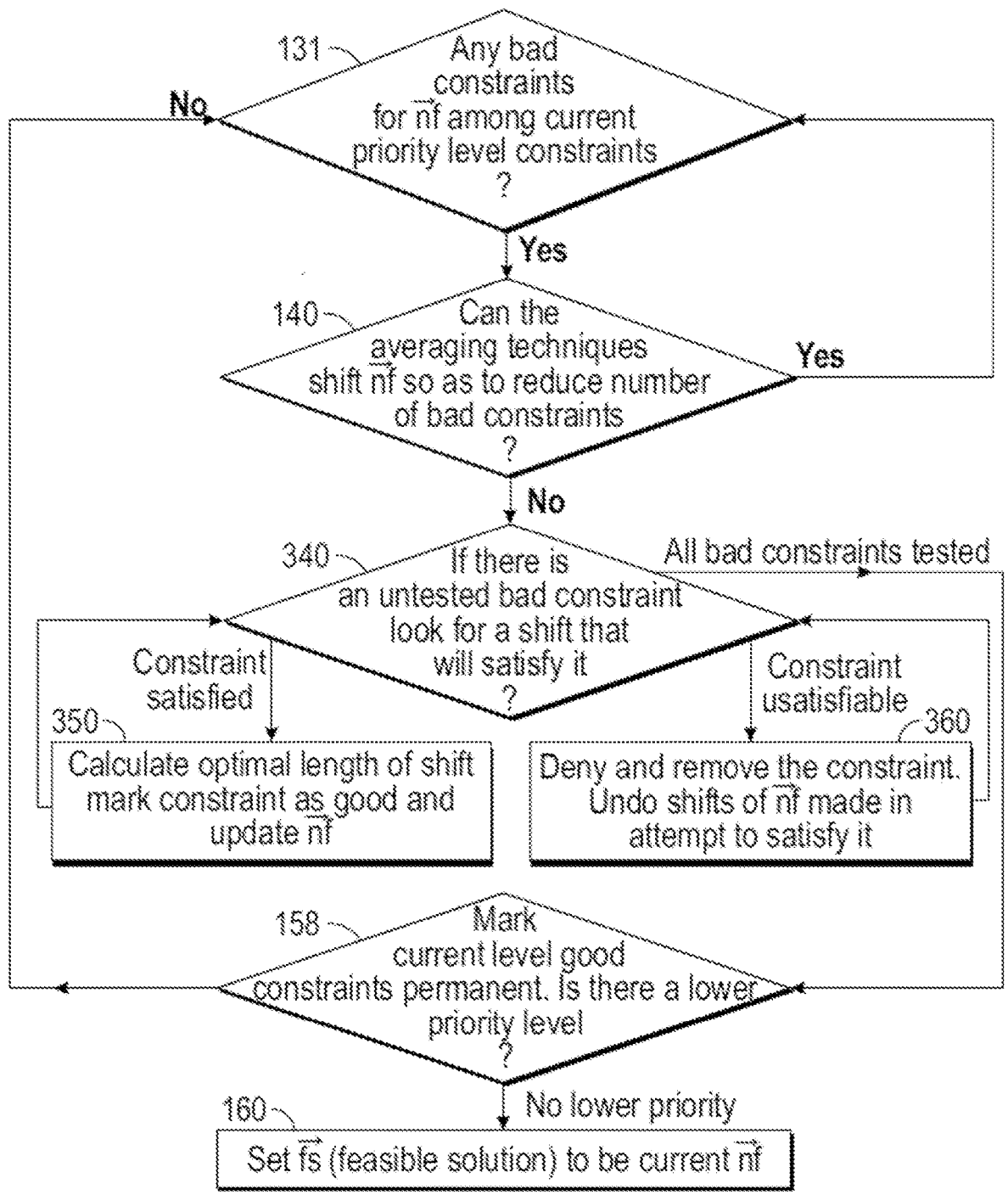
FIG. 3 depicts handling of prioritized constraints.

FIG. 3 gives an overview of the processing of the constraints of the current priority class.

FIG. 3 step 131 depicts that the existing near feasible solution may already satisfy some constraints of the current priority class and these constraints will be labeled good constraints. Constraints that are not satisfied yet are referred to as bad constraints.

FIG. 3 step 140 depicts that next Step 2A uses averaging techniques to shift the near feasible solution aiming to satisfy several bad constraints simultaneously.

FIG. 3 step 340 depicts that next Step 2B attempts to satisfy one additional constraint at a time.

FIG. 3 step 350 depicts that when Step 2B finds a solution that satisfies a bad constraint the near feasible solution is updated so that constraint becomes a good constraint.

FIG. 3 step 360 depicts if Step 2B fails to satisfy a constraint that constraint is deemed inconsistent and is to be denied and removed from further consideration. When Step 2B is done with processing all current level constraints that were not satisfied by 2A, it either finds a solution that satisfies all current priority constraints or obtains a solution that satisfies many constraints.

FIG. 3 step 158 depicts that next the satisfied constraints become permanent constraints and processing of the next lower priority class commences subject to satisfying the updated permanent constraints.

FIG. 3 step 160 depicts that when all priority levels are processed the grid solver move to the optimization phase.

Returning to FIG. 2, step 280 depicts that initial near feasible solution, $\overrightarrow{nf}$, is chosen among several candidates solution generated by averaging methods. The one candidate that satisfies the highest number of highest priority constraints is chosen to be the initial near feasible solution $\overrightarrow{nf}$. The first candidate is a unit vector in the direction of $\vec{a}$, where $\vec{a}$ is the average of the unit vectors of the high priority constraints. This vector may be referred to as the mean direction where the mean direction of a set of unit vectors is a unit vector in the direction of the sum these vectors. Since the $s_{variable}$ of $\vec{nf}$ has to be positive, the $s_{variable}$ of the mean direction is set to $|s_{variable}|$. If $s_{variable}=0$, it is set to 1 and the vector normalized. The same $s_{variable}$ directional consideration applies to other candidates. Another candidate is a weighted mean which is the mean direction of the vectors $\vec{a}''(i)$ where $\vec{a}''(i)=\vec{a}'(i)/(1+S_{variable}(\vec{a}'(i)))$ for the constraints of high priority.

FIG. 2 step 270 depicts the candidacy of few of the most significant principal component vectors of the matrix pose $(A_0)*A_0$, where $A_0$ is a matrix in which each row is $\vec{a}'(i)$ minus $\vec{a}'$ the simple mean of the rows as depicted in FIG. 2 step 260. Both the principal component and its negative are evaluated.

Another candidate for an initial near feasible solution may be the mean direction of the constraints with negative $s_{variable}$. These constraints are all the constraints that are not satisfied by $\vec{sPOS}$. If there are no such constraints, then $\vec{sPOS}$ is a feasible solution satisfying all constraints and it will be the candidate. However, if there are any such constraints, then the $s_{variable}$ of their mean will be negative and its sign will be reversed as above to get a valid candidate for an initial near feasible solution. A weighted mean direction of these of the negative $s_{variable}$ with a weight such as $\vec{a}''(i)=\vec{a}'(i)/(1+S_{variable}(\vec{a}'(i)))$ will be another candidate that will give higher priority to constraints with more negative $s_{variable}$.

Other candidates may be known prior solutions of the system under similar circumstances. This list is not exclusive and additional averaging candidate vectors with other weights may be included such as $(1+(\vec{c}')*\vec{a}'(i))/(1+S_{variable}(\vec{a}'(i)))$.

Typically, at least one of these choices satisfies half or more of the number of satisfiable constraints, thereby both saving a lot of computational time and pointing in a direction that reduces the number of denied constraints if there are conflicting constraints. The plain mean direction may fail if the constraints are symmetric. Such is the case when all constraints are equalities. The principal components option requires matrix operations, which increase computational complexity. The weighted mean approaches break potential symmetry by giving more weight to constraints that have to overcome large negative $S_{variable}$ or constraints that correlate with the benefit function. The set of constraints used for calculating the average need not be restricted to the top priority constraints and the number of satisfied constraints of lower levels may be used to break ties if several solutions satisfy the same number of top priority constraints.

Step 2A: Shift $\vec{nf}$ to Simultaneously Solve a Group of Bad Constraints

Figure 4:
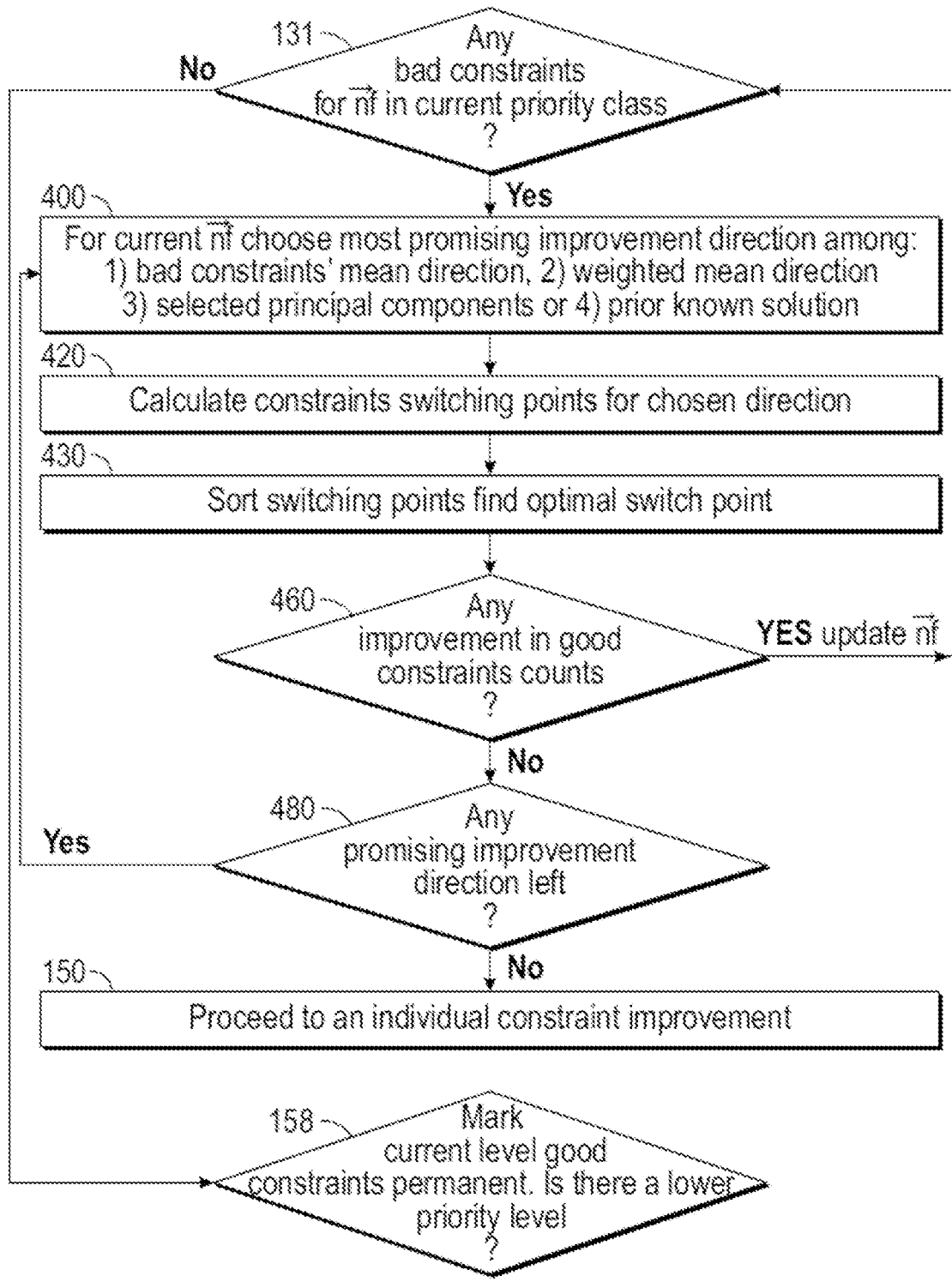
FIG. 4 depicts a method of simultaneously solving multiple constraints.

FIG. 4 depicts an example of Step 2A in more detail. If $\vec{a}'(i)*\vec{nf} \geq 0$ for the current near feasible solution, then $\vec{nf}$ is said to satisfy the corresponding constraint, and that constraint is labeled a "good constraint". Constraints for which $\vec{a}'(i)*\vec{nf}<0$ may be called a "bad constraint". As above, in some embodiments, for numerical consideration $|\vec{a}'(i)*\vec{nf}|<\epsilon 1$ may be treated as 0 thus a constraint with $\vec{a}'(i)*\vec{nf}>-\epsilon 1$ will be tolerated as satisfied.

FIG. 4 step 131 depicts that if the current $\vec{nf}$ results in some bad constraints of the current level, then Step 2A employs averaging methods to repeatedly shift $\vec{nf}$ with the intent of satisfying several bad constraints simultaneously.

FIG. 4 step 400 depicts that each shift is in a direction that is likely to increase the number of good constraints. In some embodiments, the direction of the shifts alternates between the mean direction of the remaining bad constraints, their weighted mean where the weight relates to how negative is the bad constraint, a known prior solution of the grid in a similar situation, if known, and optionally principal components unit vectors that were not used yet. If an averaging technique fails to improve the good constraints count, it is not applied again on the same set of bad constraints.

In one embodiment, the principal component vectors are ordered so that the remaining vector with the highest absolute value of its $s_{variable}$ (artificial resource allocation variable) is chosen with each iteration. Unlike conventional principal component analysis in which principal component vectors are sorted by their eigenvalues, embodiments described herein may sort these vectors by the absolute value of their $s_{variable}$, which tends to yield the fastest improvement in the number of good constraints. This iterative improvement continues until the group technique fails to improve further (no increase in the number of good constraints) over consecutive iterations.

FIG. 4 steps 420 and 430 depict the calculation of the optimal length of the shift in the direction suggested by the averaging method. If $\vec{nf}$ is the current near feasible solution, and $\vec{nfn}$ the new near feasible solution, $\vec{d}$ a unit vector in the direction of the shift, and $\lambda$ the length of the shift, then $\vec{nfn}=\vec{nf}+\lambda*\vec{d}$. $\lambda$ is calculated to be the number that results in the maximum number of good constraints for $\vec{nfn}$ while not violating any permanent (higher priority) constraint and keeping $s_{variable}$ greater than $\epsilon 1$.

The calculation of $\lambda$ may proceed as follows. For each unit vector $\vec{a}'$, representing a constraint, $\vec{a}'*\vec{d}$ is calculated. If $\vec{a}'*\vec{d}>0$, then a move with $\lambda>0$ increases $\vec{nfn}*\vec{a}'$ so if $\vec{a}'$ was a bad constraint then big enough, $\lambda$ will make it positive and good. Conversely, if $\vec{a}'*\vec{d}<0$, then a move with $\lambda>0$ decreases $\vec{nfn}*\vec{a}'$ so if $\vec{a}'$ was a good constraint then big enough, $\lambda$ will make it negative and bad. Similarly, if $\lambda$ is negative and $\vec{a}'*\vec{d}>0$, then the move will decrease $\vec{nfn}*\vec{a}'$, so if $\vec{a}'$ was a good constraint negative enough, $\lambda$ will make it negative and bad. Conversely, if $\vec{a}'(i)*\vec{d}<0$, then a move with $\lambda<0$ increases $\vec{nfn}*\vec{a}'$ so if $\vec{a}'$ was a bad constraint then negative enough, $\lambda$ will make it positive and a good constraint.

FIG. 4 step 420 depicts that next for each constraint with non-zero $\vec{a}'*\vec{d}$, a switch point from good to bad and vice versa is calculated.

FIG. 4 step 430 depicts that next the switch points are sorted and then Step 2A scans the switch point from $\lambda=0$ along the $\lambda>0$ axis and counts switches up and down to find the positive $\lambda$ that yields the highest number of good constraints. The range that λ may take is limited so as not to violate any higher priority permanent constraint and keeping the $s_{variable}$ greater than ε1. λ is set to be the midpoint between the switch points, producing the most good constraints and the closer point between the next switch point, where the count goes down, or the point where a higher priority good constraint becomes bad or $s_{variable}$<ε1. Similarly, the best negative λ is calculated. The λ that results in the most improvement in the number of good constraints is selected to update the new near feasible solution $\vec{nf1}$.

FIG. 4 step 460 depicts that if the bad constraints count decreased then Step 2A runs again on the updated near feasible solution.

FIG. 4 step 480 depicts that if direction $\vec{d}$ failed to decrease the bad constraint count then the averaging technique that yielded $\vec{d}$ is abandoned. Next if an alternative averaging technique is available Step 2A repeats with that direction otherwise the process continues to Step 2B as depicted in FIG. 4 step 150.

The aforementioned choices of the shift directions in Step 2A need not be exclusive. Machine learning approaches may be integrated as data associated with operating the grid is gained. For instance, a shift in the direction of prior feasible solutions under similar circumstances (similar time of day, date and weather) and stored in a database is an option. Also, other weighted averaging techniques of the bad constraints may be used. For instance, the weighted sum of all pairs of bad constraints may be used, where the weighted sum of each pair of bad constraints is a vector that is the sum of the two unit vectors of the two constraints divided by the norm of that sum squared.

Thus, in some embodiments, these various options may be experimentally evaluated and a best solution for a specific scenario may be chosen.

Step 2B: Shift $\vec{nf}$ to Solve an Individual Bad Constraint

Figure 5:
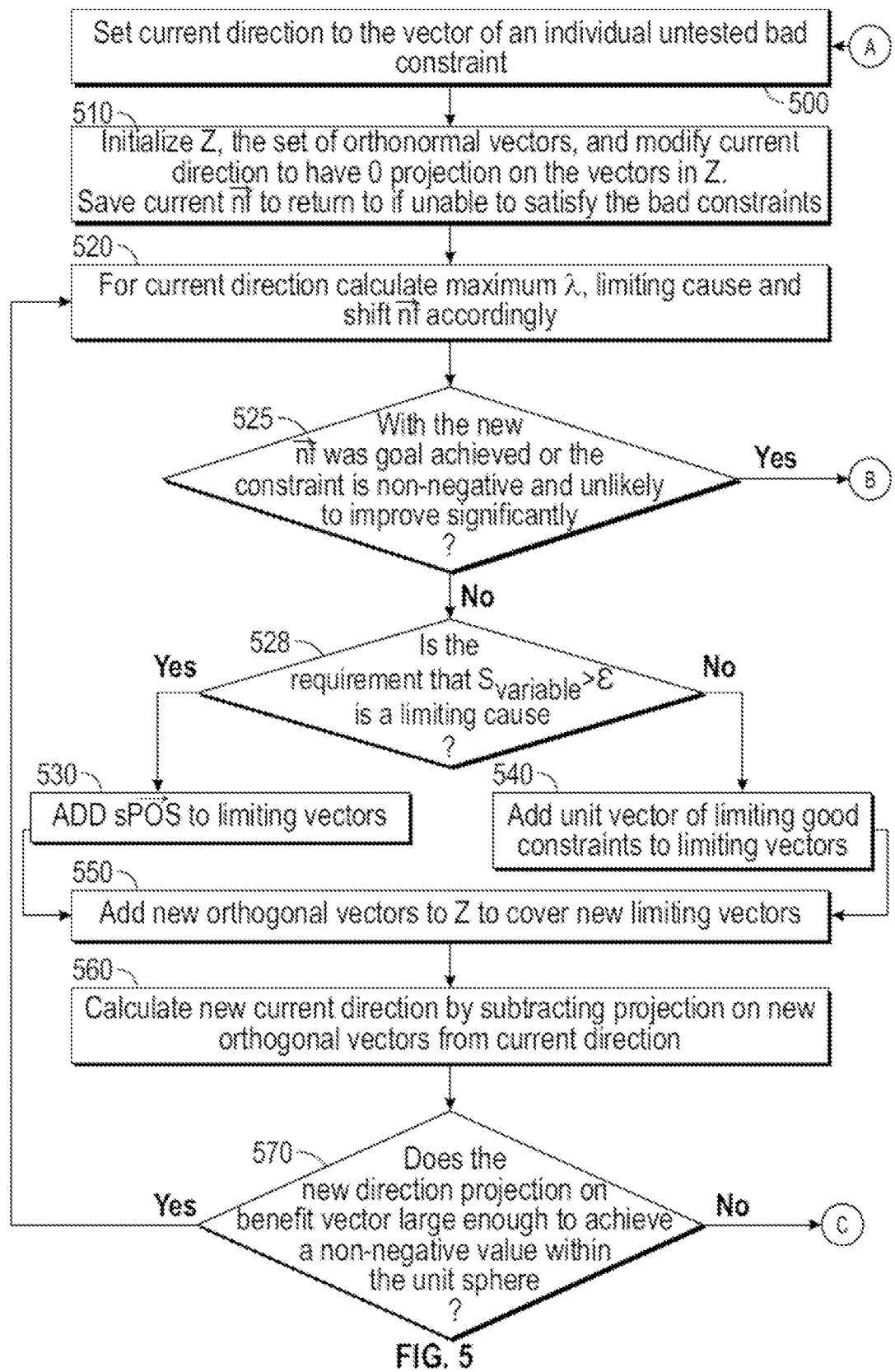
FIG. 5 depicts a method of solving individual constraints by gradient ascent on the unit sphere.
Figure 5:
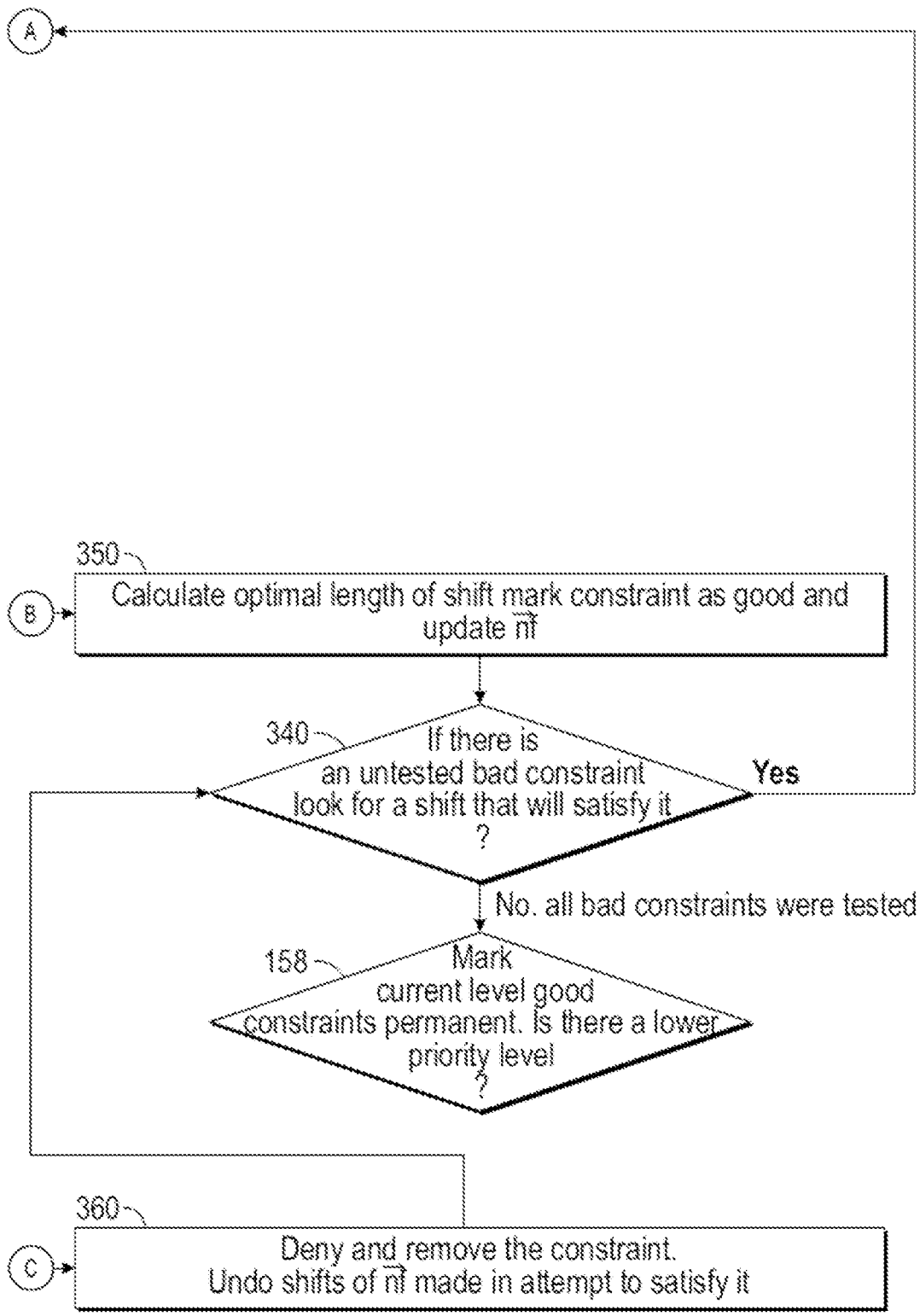

FIG. 5 depicts Step 2B, a method that aims at satisfying one individual bad constraint at a time, making it a good constraint.

FIG. 5 step 500 depicts that when a bad constraint is selected, then Step 2B applies a gradient ascent method to shift $\vec{nf}$ in directions derived from the vector of that constraint. These shifts aim at satisfying the constraint by increasing the constraint's value to non-negative while continuing to satisfy all of the current good constraints.

FIG. 5 step 340 depicts that Step 2B is applied to all of the bad constraints of the current priority level one at a time trying to find a near feasible solution that satisfies each. Step 340 further depicts that once all bad constraints of the current priority level are processed, the new good constraints become permanent and the bad constraints are denied.

FIG. 5 step 158 depicts that if there is a lower level of constraints it is processed next otherwise benefit optimization commences.

FIG. 5 step 510 depicts that Step 2B saves the current $\vec{nf}$ when it starts processing a bad constraints for later reference. Step 510 further depicts that the initial shift of $\vec{nf}$ for the gradient ascent method will be in the direction of $\vec{a'}$ the unit vector of the bad constraint being worked on after deduction of the projections on the vectors of Z. Z is a set of orthonormal vectors that all shifts of Step 2B must have 0 projection on. When Step 2B starts for the first time, Z is equal to $Z_{permanent}$, which is initialized as an empty set but may expand as shown below. This shift will result in a new near feasible solution $\vec{nfn}$. The iterations continues while the shift positively correlates with $\vec{a'}$ so that $\vec{nfn}*\vec{a'}$ will be greater than $\vec{nf}*\vec{a'}$. The magnitude of the shift and the direction of subsequent shifts as depicted in FIG. 5 step 520 are described below with regard to a gradient ascent method.

FIG. 5 step 580 depicts that if the gradient ascent achieves $\vec{nfn}*\vec{a'}≥0$, e.g., satisfying the bad constraint the near feasible solution is updated and the constraint is marked as a good constraint.

FIG. 5 step 360 depicts that if the gradient ascent terminates without satisfying the constraint that constraint is marked as inconsistent and the saved initial $\vec{nf}$ is restored.

FIG. 5 step 525 depicts that the gradient ascent method attempts to achieve $\vec{nfn}$ such that $\vec{nfn}*\vec{a'}$ is strictly positive.

FIG. 5 step 580 depicts that the optimal shift may be a point in between the initial $\vec{nf}$ and the final $\vec{nfn}$. While all that is required to satisfy $\vec{a'}$ is to have $\vec{nfn}*\vec{a'}≥0$, it is preferable for numerical stability to have $\vec{nfn}*\vec{a'}$ strictly positive so that $\vec{nfn}$ will be an internal point of the convex polytope of the feasible solutions. This avoids some numerical round off issues when running on the margin of the polytope. For that reason, the gradient ascent continues if possible past the point of achieving non-negativity in trying to reach a positive $\vec{nfn}*\vec{a'}$ greater than a predetermined threshold depending on $|\vec{nf}*\vec{a'}|$ the numerical properties of the model. The final $\vec{nf}$ is calculated to be on the line between the $\vec{nf}$ that was saved upon entering the gradient ascent and the final $\vec{nfn}$ result of the gradient ascent.

One choice for the final result is the point where $\vec{nf}*\vec{a'}$ reaches a value half the maximum value achieved by $\vec{nfn}*\vec{a'}$. This will be an internal point because of the polytope convexity as long as the starting $\vec{nf}$ is an internal point. Alternatively, the direction from the starting $\vec{nf}$ to the final $\vec{nfn}$ is used as a direction of improvement as in Step 2A, trying to convert some additional bad constraints to good constraints in addition to solving the individual constraint being solved. This alternative requires more computation time but may be advantageous if Step 2A terminated with many bad constraints.

Thus, Step 2A is geared towards efficiently finding a near feasible solution that satisfies a majority of the satisfiable constraints. Step 2B, which is both more computationally demanding and more prone to numerical round off problems, then determines the status of more marginal constraints. If Step 2B would have started on its own, it may satisfy first an outlier constraint resulting in many unsatisfied constraints that could have been satisfied otherwise. Embodiments that start with Step 2A typically find a near feasible solution that satisfies half or more of the largest number of possible good constraints. This way, Step 2B is likely to detect fewer incompatible constraints while increasing the number of satisfied constraints. Step 2A facilitates the convergence of Step 2B on a near feasible solution that will satisfy the majority of the constraints that can be satisfied. In some methods, the bad constraints are ordered by their correlation with the benefit vector trying to satisfy more beneficial constraints first.

As Steps 2A and 2B iterate through lower priority levels of constraints, the good constraints of higher levels are permanent and cannot be violated. Step 158 of FIGS. 1, 3, and 5 depicts that when Step 2B finishes iterating through all bad constraints of the current priority level, the current good constraints are marked permanent. These permanent constraints cannot be violated when working on lower priority level constraints. This means that if the maximum achievable value of a permanent good constraint is considered zero then all future shifts of the near feasible solutions are restricted to have zero projection on the vector of that constraint. An efficient way of keeping track of that is to have a set of orthogonal vectors $Z_{permanent}$, a set of permanent orthonormal vectors upon which all future shifts must have zero projections. Maintaining this orthonormal system saves computation time as it saves iterations. $Z_{permanent}$ expansion occurs, for instance, when both constraints derived from an equality become permanent constraints. The residue of the unit vector in the direction of the vector of the zero value permanent constraint after subtracting its projection on the existing vectors in $Z_{permanent}$ is calculated. If that residue is not a zero then the residue vector is normalized and added to $Z_{permanent}$.

For instance, when a near feasible solution satisfies both constraints associated with an equality; then from that point on, all shifts will be within the hyperplane defined by that equality.

FIG. 5 step 360 depicts that constraints that remain bad constraints are removed from further consideration and will be denied automatically if the hardware provide for it (such as by denying some consumers demand or turning off a portion of the grid) or will require manual intervention. When Steps 2A and 2B are done with the lowest priority level, the final $\vec{nf}$ is taken as a feasible solution $\vec{fs}$ of the permanent good constraints.

Step 3: Modifying the Feasible Solution to Maximize the Benefit (FIG. 6)

Figure 6:
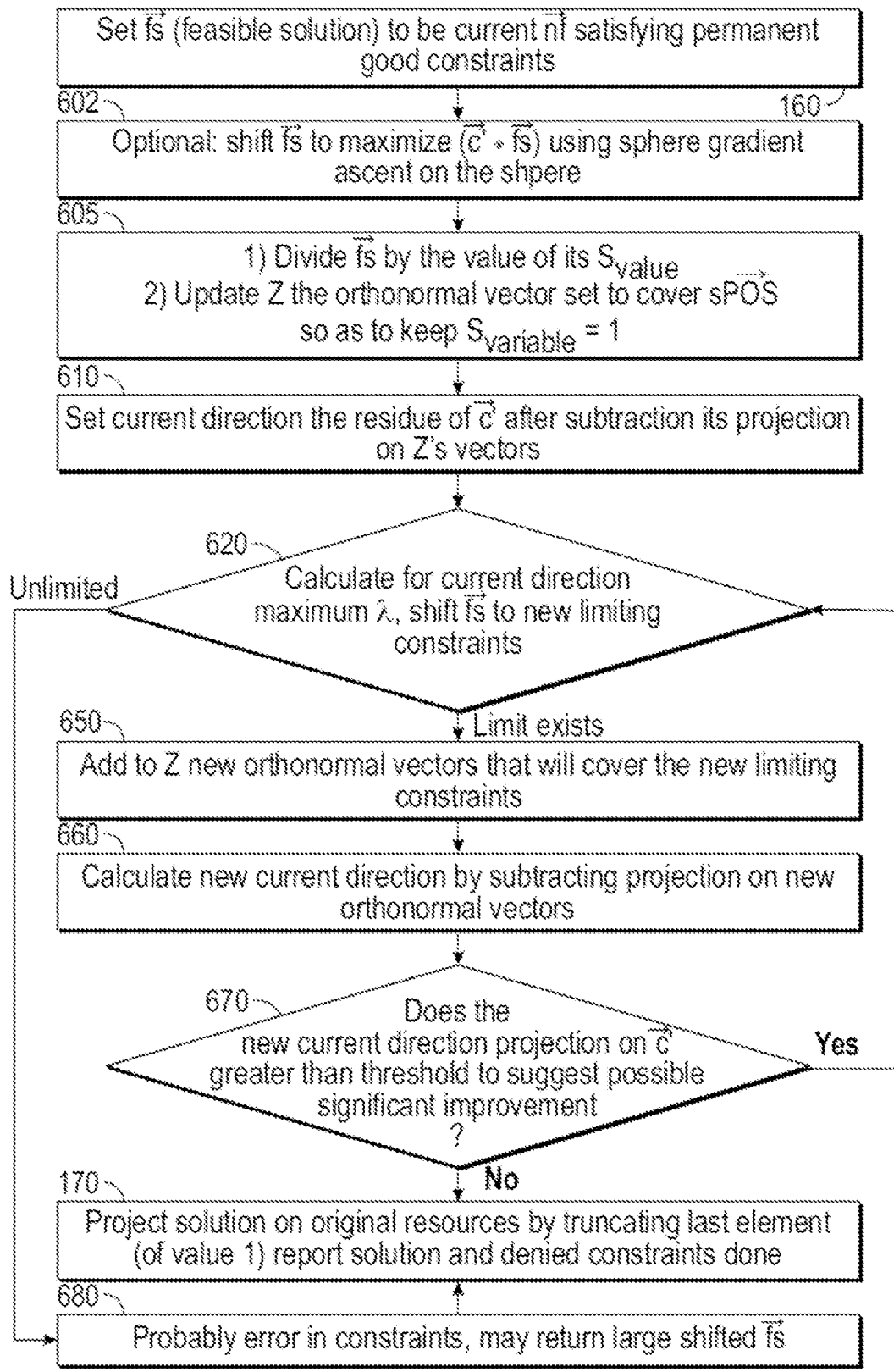
FIG. 6 depicts an example of maximizing a benefit function with ascent in the hyperplane.

Step 3, depicted in FIG. 6, optimizes the system benefit by shifting $\vec{fs}$, the feasible solution so as to maximize the benefit function $\vec{c'}*\vec{fs}$.

FIG. 6 step 160 depicts that the initial $\vec{fs}$ is the final near feasible solution of Steps 2A and 2B. Next, Step 3 shifts $\vec{fs}$ in the direction derived from $\vec{c'}$ so as to increase the benefit function $\vec{c'}*\vec{fs}$ while keeping the permanent good constraints satisfied.

FIG. 6 step 602 depicts that Step 3 may start by applying the gradient ascent of Step 2B to shift $\vec{fs}$ in the direction of $\vec{c'}$ as far as possible on the part of the unit sphere where $s_{variable} > \varepsilon1$ to increase $\vec{c'}*\vec{fs}$, subject to the restriction of the permanent good constraints. Application of the gradient ascent on the unit sphere of Step 2B, to shift $\vec{fs}$ to increase $\vec{c'}*\vec{fs}$, is oriented towards finding non-negative $\vec{c'}*\vec{fs}$ as opposed to maximizing it. However, the gradient ascent on the sphere with $\vec{c'}$ as the objective can show if the benefit function can achieve a positive value subject to the permanent good constraints.

FIG. 6 step 605 depicts that the feasible solution on the unit sphere $\vec{fs}$ is projected onto the hyperplane where the $s_{variable}=1$. This is done by dividing $\vec{fs}$ by the value of its $s_{variable}$ (the vector's last element) that is strictly positive and greater than $\varepsilon1$, resulting in $\vec{fs}$ that is in the hyperplane where $s_{variable}=1$.

FIG. 6 steps 610-670 depict a gradient ascent method in the hyperplane where $s_{variable}=1$ in the direction of $\vec{c'}$ maximizes the benefit function $\vec{fs}*\vec{c'}$.

Step 170 of FIG. 6 depicts that the actual control vector for the grid is then obtained by truncating the $s_{variable}$ (the added dimension in the $var_{count}+1$ space) from the optimal feasible solution on the hyperplane where $s_{variable}=1$.

Gradient Ascent Method

Steps 2B and 3, as described with respect to FIGS. 5 and 6, involve an iterative process, which shifts a vector $\vec{nf}$ in the unit sphere in Step 2B or in the hyperplane where $s_{variable}=1$ in Step 3. These shifts increase the value of $\vec{cc}*\vec{nf}$ for a given vector $\vec{cc}$ while keeping $\vec{nf}$, satisfying the current good constraints. In Step 2B, $\vec{cc}$ is the unit vector in the direction of a bad constraint that is being converted to a good constraint. In Step 3, $\vec{cc}$ is $\vec{c'}$, is the normalized second format benefit vector. This iterative process is named the gradient ascent method.

$Z_{permanent}$ is a set of orthonormal vectors initialized as an empty set when Step 2B is activated for the first time. $Z_{permanent}$ expands when a zero value constraint become permanent, as described above. FIG. 5 step 510 depicts that when Step 2 is entered Z is initialized to be identical to $Z_{permanent}$. FIG. 6 step 605 depicts that when entering Step 3 Z is initialized to be $Z_{permanent}$ plus $\overrightarrow{sPOS}$. FIG. 5 step 510 and FIG. 6 step 610 depict that the initial shift of the gradient ascent is in the direction of $\vec{rc}$ the normalized residue of $\vec{cc}$ after subtracting its projection on the vectors of Z. With each iteration, the gradient ascent adds vectors derived from new limiting constraints to Z so that all further shifts for that run of the gradient ascent will have zero projection on the vector of the new limiting constraints.

FIG. 5 step 520 and FIG. 6 step 620 depicts that next the gradient ascent calculates the maximum shift in $\vec{rc}$ direction without violating a good constraint. A good constraint that produces the tightest limit for that move is detected and is labeled as a "limiting constraint". FIG. 5 step 528 depicts that for 2B a limiting constraint may be the requirement that $\overrightarrow{s_{variable}} > \varepsilon1$. In that case $\overrightarrow{sPOS}$ is the limiting constraint. When the gradient ascent shifts $\vec{nf}$ in the direction of the unit vector $\vec{rc}$ for the distance of $\lambda$ it will arrive at $\vec{nf1}=\vec{nf}+\lambda*\vec{cc}$. For all $\vec{g}$, the unit vectors that represent a good constraint, if $\vec{g}*\vec{rc}<0$ then $\lambda$ has to be less than $$\frac{-(\vec{g}*\vec{nf})}{(\vec{g}*\vec{rc})}$$

to prevent $\vec{g}*\vec{nf1}$ from becoming negative.

FIG. 5 step 528 depicts that if the $s_{variable}$ of $\vec{rc}$ is negative, then λ must be limited so as not to reduce the value of $s_{variable}$ of $\vec{nf1}$ below a threshold ε1. As discussed earlier, that is required to assure that $\vec{nf1}$ can be converted to the original resource allocation. The case where there is no limit on the shift requires special handling. That will be the case when $\vec{g}*\vec{rc} \geq 0$ for all $\vec{g}$, that represent a good constraint and $s_{variable} \geq \varepsilon 1$. For the gradient ascent on the unit sphere it means that the shift is to the unit vector $\vec{rc}$ as it is on the unit sphere. The gradient ascent terminate at that point and if $\vec{rc}*\vec{cc} > \vec{nf}*\vec{cc}$ then $\vec{nf}$ is updated to $\vec{rc}$ and that is the final result of the gradient ascent.

FIG. 6 step 680 depicts that an unlimited shift direction occurrence during the gradient ascent on the hyperplane $S_{variable}=1$ probably means that a missing constraint as the possibility of unlimited benefit is not realistic. In this case the method may return a large benefit solution but must indicate that there is probably a missing constraint. One cause of this situation may be that what would have been a limiting constraint had lower priority and it was denied. The method may scan all discarded constraints that have negative correlation with $\vec{rc}$ and suggest that one of these should be given top priority so as not to be denied.

As depicted in FIG. 5 step 520 and FIG. 6 step 620, the gradient ascent method calculates the minimum of the λ of the last two paragraphs and that minimum is the maximum allowed move in the direction of $\vec{rc}$. As depicted in FIG. 5 step 550 and FIG. 6 step 650, the gradient ascent expand Z to cover $\vec{limit}$, the unit vector of the constraint(s) that is the tightest limit on λ. FIG. 5 step 530 depicts that if $s_{variable} > \varepsilon 1$ is the limiting factor then $\vec{sPOS}$ is added to Z. FIG. 5 step 540 and FIG. 6 step 650 depicts that if the $\vec{limit}$ is not in the span of the vectors already in Z, then a unit vector in the direction of the residue of $\vec{limit}$ after subtracting all projections on vectors in Z is added to Z. FIG. 5 step 560 and FIG. 6 step 660 depicts that the new direction of improvement, $\vec{rc}$ will be in the direction of the old $\vec{rc}$ after subtracting all projections on the new vectors in Z. The process continues iteratively in the direction of the new $\vec{rc}$.

In the case of Step 2B, the gradient ascent iterates until either the bad constraint achieves a sufficient positive value as depicted in FIG. 5 step 525 or achieving such a value is numerically impossible as $\vec{cc}*\vec{rc}$ is too little, as depicted in FIG. 5 step 570. In the case of Step 3, the gradient ascent iterations stops when $\vec{cc}*\vec{rc}$ is small enough to make further improvement numerically insignificant as depicted in FIG. 6 step 670.

Each iteration is a low polynomial computational efficiency in the number of variables and equations. Also, the calculations involve vector addition and multiplication that for the sparse data of the grid are implemented efficiently by keeping vectors as a list of nonzero elements rather than as arrays.

Applicability in Other Contexts

While the foregoing description focuses on electrical grids as one example, the methods described herein may be applied to optimizing constraints in other fields.

One such example is allocating resources in cloud computing environments. For example, a cloud computing environment may be represented in a control system, such as those described herein, as a set of linear equations representing the constraints on the resources and a benefit function that is a linear expression of the allocated resources to be optimized. Examples of controllable resources include a user's allocation of time on processing units and allocation of communication channels and data-bases access time and rate to each user. Examples of constraints include at any point of time the total number of available processing units that may be shared simultaneously by all users, total memory storage capacity, network communication capacity, etc. In one example, the benefit function to be optimized may be the income for the allocation of the resources less the marginal costs of operating these resources.

Unlike power networks that distribute a single type of resource (electrical energy), the cloud computing user may consume several types of resources. Consequently, the constraints representing a single user's demands may be cross-referenced so that denying a user will release all the constraints associated with that user. The systems and methods described herein may thus also provide for an efficient allocation of resources for optimizing a cloud computing environment. Other examples and contexts are likewise possible.

Example Method

Figure 7:
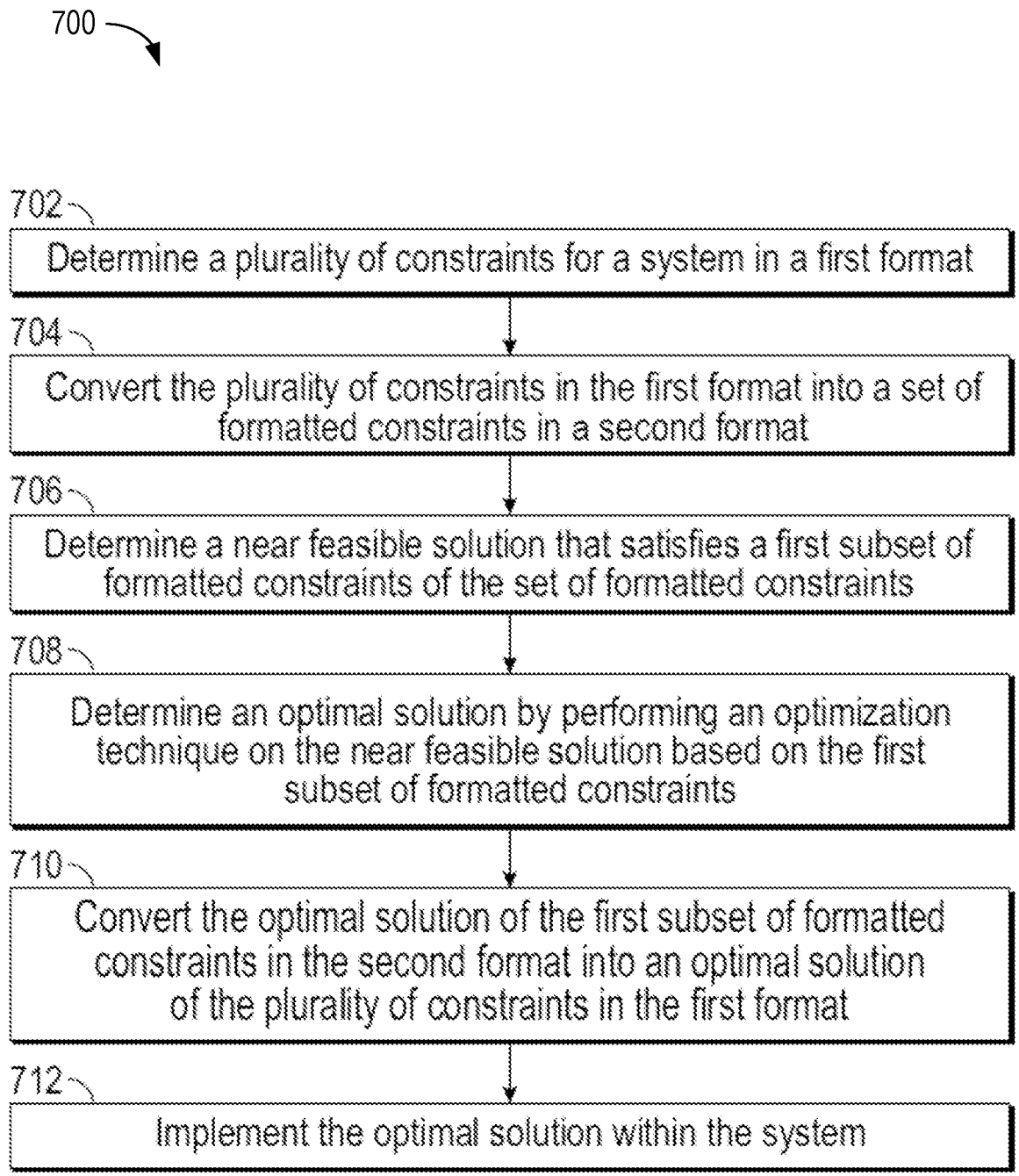
FIG. 7 depicts an example method for controlling a system according to embodiments described herein.

FIG. 7 depicts an example method 700 for controlling a system according to embodiments described herein.

Method 700 begins at step 702 with determining a plurality of constraints for a system in a first format.

In some cases, at least one constraint of the plurality of constraints comprises a discrete constraint associated with a discrete variable, such as described in further detail below with respect to FIG. 8.

Method 700 then proceeds to step 704 with converting the plurality of constraints in the first format into a set of formatted constraints in a second format.

In some cases, step 704 includes converting the discrete constraint into a plurality of constraints in the second format comprising inequalities bounding a value of the discrete variable along a continuous segment between two integer values, as described further below with respect to FIG. 8.

Method 700 then proceeds to step 706 with determining a near feasible solution that satisfies a first subset of formatted constraints of the set of formatted constraints.

Method 700 then proceeds to step 708 with determining an optimal solution by performing an optimization technique on the near feasible solution based on the first subset of formatted constraints.

In some cases, such as where the plurality of constraints includes at least one discrete constraint requiring an integer value, step 708 instead determines a best solution because an optimal solution may not be guaranteed with discrete constraints.

Method 700 then proceeds to step 710 with converting the optimal solution of the first subset of formatted constraints in the second format into an optimal solution of the plurality of constraints in the first format.

As above, where step 708 determines a best solution given one or more discrete constraints in the plurality of constraints, then the best solution of the first subset of formatted constraints in the second format is converted into the best solution of the plurality of constraints in the first format.

Method 700 then proceeds to step 712 with implementing the optimal solution within the system.

As above, where the solution is a best solution given one or more discrete constraints in the plurality of constraints, then step 712 implements the best solution within the system.

In some embodiments, method 700 further includes: determining a second subset of formatted constraints of the set of formatted constraints that are not satisfied by the near feasible solution; performing a shift of the near feasible solution in a direction determined based on the second subset of the formatted constraints to a distance determined based on the first subset of formatted constraints and the second subset of formatted constraints; determining whether the shift results in any formatted constraints in the second subset of formatted constraints becoming satisfied; and adding any formatted constraints in the second subset of formatted constraints that become satisfied after the shift to the first subset of formatted constraints.

In some embodiments, method 700 further includes: performing the optimization technique on the near feasible solution with respect to a selected formatted constraint of the second subset of formatted constraints; adding the selected formatted constraint to the first subset of formatted constraints if the selected formatted constraint is satisfied after performing the optimization technique; and removing the selected formatted constraint from the first subset of formatted constraints if the selected formatted constraint is not satisfied after performing the optimization technique.

In some embodiments of method 700, determining the near feasible solution includes: determining a set of highest priority formatted constraints; determining an average direction solution based on an average direction of vectors representing the set of highest priority formatted constraints; and determining a number of unsatisfied constraints associated with the average direction solution.

In some embodiments of method 700, determining the near feasible solution further includes: calculating principal components of a matrix comprised of vectors representing the set of highest priority formatted constraints minus an average direction of the vectors representing the set of highest priority formatted constraints; sorting the principal components by absolute value of an artificial resource allocation variable to determine a principal components solution; and determining a number of unsatisfied constraints associated with a shift from the near feasible solution in the direction of the principal components solution.

In some embodiments of method 700, determining the near feasible solution further includes: determining a prior known solution; and determining a number of unsatisfied constraints associated with the prior known solution.

In some embodiments of method 700, determining the near feasible solution further includes: determining solution with a lowest number of bad constraints among the average direction solution, the principal components solution, and the prior known solution based on the number of unsatisfied constraints associated with the average direction solution, the number of unsatisfied constraints associated with the principal components solution, and the number of unsatisfied constraints associated with the prior known solution; and setting the near feasible solution as the lowest bad constraint solution.

In some embodiments of method 700, the optimization technique comprises a gradient ascent technique, such as described with respect to FIG. 6.

In some embodiments of method 700, the second format comprises form $\vec{a}'(i) * \vec{x}' \geq 0$, $\vec{a}(i)$ is a vector representing an ith constraints of the system, and $\vec{x}'$ is a vector representing a set of resource allocations for the system.

In some embodiments of method 700, the system comprises an electrical grid control system, and the plurality of constraints comprise constraints associated with an electric grid controlled, at least in part, by the electrical grid control system.

In some embodiments, method 700 further includes determining an integer value for the discrete variable. In some cases, this integer value may derived by shifting the near feasible solution for the discrete variable in the second format, which allows solutions in the continuous segment, and choosing an allowed integer value based on that feasible solution, such as described in more detail with respect to FIG. 8. For example, selection of an integer value for the discrete variable may be based on the solution in the second format for the value of the discrete variable being closer to one end of the continuous segment than the other end of the continuous segment after performing the shift. Generally, an integer value for the discrete constraint that is a feasible solution under the higher priority permanent constraints yields the most benefit among all feasible discrete values of that discrete variable under the higher priority permanent constraints.

Notably, FIG. 7 is just one example, and others methods consistent with the embodiments described herein are possible.

Extension to Integer Programming

Certain devices in a system (e.g., on a smart grid) may operate in one of few discrete states and thus may be referred to as discrete devices. For instance, a simple switch may be in only two states: "on" or "off". Representation of these devices in a control methodology may be benefited by a new class of constraints limiting the values of the variables representing these devices to take integer values in a certain range. With the addition of discrete devices, finding a feasible solution and an optimal solution is computationally more difficult as the space of feasible solutions with the added discrete constraints is no longer convex. In general, the computational resources required to optimize such systems grow exponentially with the number of discrete constraints. However, prioritizing of constraints combined with a gradient ascent method provide a mechanism of obtaining solutions, which beneficially allows operating a system (such as an electric grid) requiring computational time that grows only low polynomially with the number of variables. For simplicity of the descriptions below, discrete variables will be assumed to have two discrete values: 0 or 1, but other values are possible in other examples.

Figure 8:
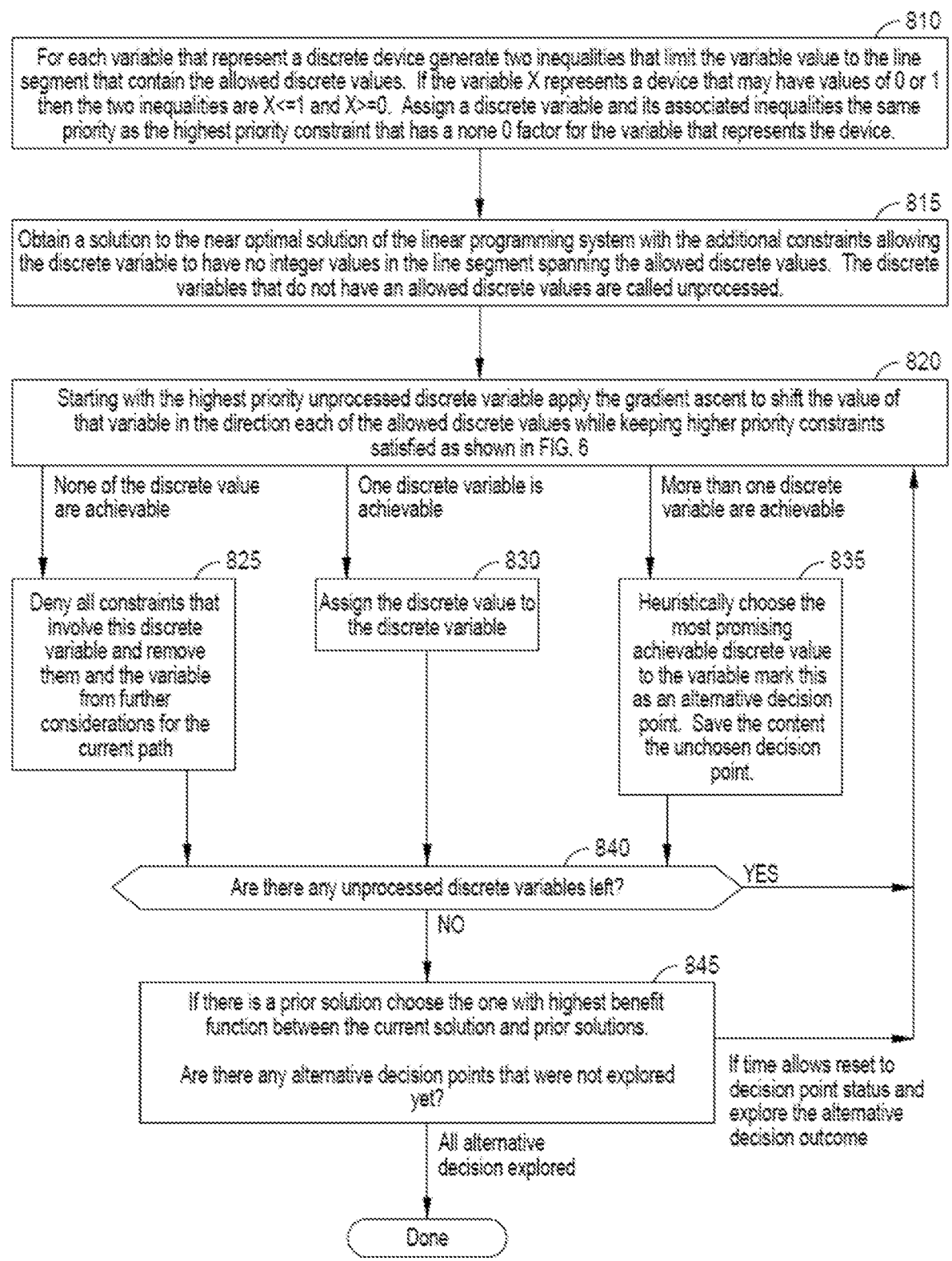
FIG. 8 depicts an example method for solving for constraints with discrete devices.

FIG. 8 depicts an example method for solving constraints in a system (e.g., an electric grid system) with discrete devices.

The method starts at step 810 with assigning priorities to the discrete devices. The priority of such a discrete device is the same as the highest priority constraint that involves this device. Artificial inequalities limiting the variable representing the device to be greater than or equal to 0 and less than or equal to 1 are added and are given the same priority as the device (the highest priority of constraint involving the device).

At step 815, the near optimal solution of the new constraints system is obtained using the methods described above for linear programming systems, which allow the variable describing the discrete devices to take any real value in the segment [0:1]. This will be the current solution and variables that represent discrete devices and have a non-integer value will be labeled as unprocessed variables.

At step 820, the gradient ascent method attempts to shift the highest priority unprocessed variable towards its allowed discrete value. For example, if the allowed values are 0 and 1, then the current solution linear programming value will be between 0 and 1. The gradient ascent first attempts to shift the unprocessed variable to 0 and to 1, and both attempts are subject to the higher priority (permanent) constraints remaining satisfied. At this point, the lower priority discrete variables are still allowed to take any value between 0 and 1.

At step 825, if neither 0 nor 1 values can be achieved for the current highest priority discrete device subject to higher priority constraints, then the constraints that evoke that discrete device may be denied.

At step 830, if only one of the possible discrete values can be achieved by the shift, then that value is assigned to the discrete device, and the method continues to the next lower priority discrete device that has no discrete value assigned yet.

At step 835, if multiple discrete values can be achieved for the variable representing the discrete device by shifting the solution (subject to the higher priority constraints), then the discrete variable is set to one of these values. The choice of the allowed value may be determined heuristically, as described below, where the choice of value is generally based on the value that is more likely to result in a more beneficial solution for the system.

The method continues to process the next unprocessed discrete variable of highest priority subject to choice just made. The alternative choice information is saved so that the method may return to explore the outcome if the other discrete value is chosen and choose the more beneficial solution.

At step 840, the method continues to process the next highest priority unprocessed discrete variable if any is left.

At step 845, once all discrete variables are assigned a discrete value, or denied based on an inability to achieve the discrete value while maintaining other higher priority constraints, then that solution is compared with the alternative existing solution, if any, and the more beneficial solution is saved. If there are possible alternative values for discrete variables that were not explored yet, these are then analyzed if time permits.

Once the method processes all discrete variables, there is a workable solution. Getting the first solution is an efficient process requiring computing resources proportional to a low power of the size of constraints and variables. While additional computing resources are available, the method revisits the heuristic decision points and explores the outcome of alternative decisions in search for better solutions. Each such alternative doubles the time to the terminal solution from that point, which means that the task of exploring alternatives grows exponentially with the number of discrete variables that have more than one solution. For large systems, the process may run out of computing resources (e.g., computing time) without exploring all alternative choices. Thus, the solution may not be guaranteed to be optimal, but the solution will be available so that the system can operate nonetheless. In the example of an electric grid, while the solution may not be a global optimum, it may nevertheless allow the electric grid to run safely.

Heuristic approaches as to which of the discrete values to choose first may include the discrete value that is closer to the existing non-discrete solution (e.g., choosing the discrete value of 1 if the non-discrete solution is >0.5). More sophisticated heuristics may choose to process first the discrete solution that causes the least number of lower priority constraints to be denied, or the one that yields the maximum value of the benefit function when allowing lower priority discrete variables to have a non-discrete solution.

Example Processing System

Figure 9:
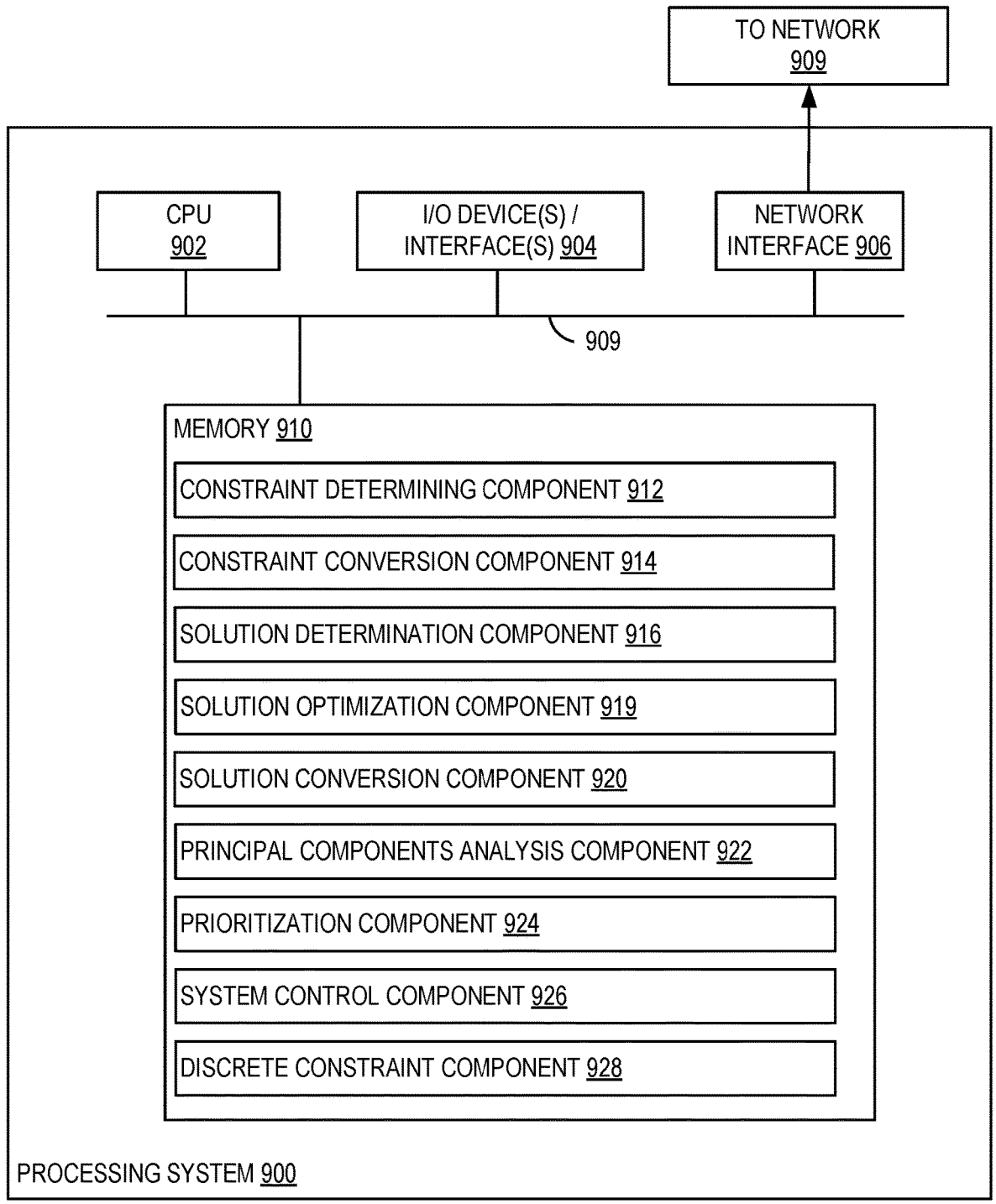
FIG. 9 depicts an exemplary processing system configured to perform the methods described herein.

FIG. 9 depicts an exemplary processing system 900 configured to perform the methods described herein, including controlling an electric power grid utilizing linear programming.

Processing system 900 includes a CPU 902 connected to a data bus 909. CPU 902 is configured to process computer-executable instructions, e.g., stored in memory 910 and to cause processing system 900 to perform methods as described herein, for example with respect to FIGS. 1-8. CPU 902 is included to be representative of a single CPU, multiple CPUs, a single CPU having multiple processing cores, and other forms of processing architecture capable of executing computer-executable instructions.

Processing system 900 further includes input/output devices and interface 904, which allows processing system 900 to interface with input/output devices, such as, for example, keyboards, displays, mouse devices, pen input, touch sensitive input devices, cameras, microphones, and other devices that allow for interaction with processing system 900. Note that while not depicted with independent external I/O devices, processing system 900 may connect with external I/O devices through physical and wireless connections (e.g., an external display device).

Processing system 900 further includes network interface 906, which provides processing system 900 with access to external computing devices, such as via network 909.

Processing system 900 further includes memory 910, which in this example includes various components configured to perform the functions described herein.

In this example, memory 910 includes constraint determining component 912, constraint conversion component 914, solution determination component 916, solution optimization component 918, solution conversion component 920, principal components analysis component 922, prioritization component 924, system control component 926, and discrete constraint component 928. These various components may, for example, comprise computer-executable instructions configured to perform the various functions described herein.

Note that while shown as a single memory 910 in FIG. 9 for simplicity, the various aspects stored in memory 910 may be stored in different physical memories, but all accessible CPU 902 via internal data connections, such as bus 912, or external connections via network interface 906. For example, some components of memory 910 may be executed locally by processing system 900, while others may be performed on remote processing systems or in cloud-based processing systems in other embodiments.

Notably, FIG. 9 depicts just one example of a processing system and others are possible.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components, as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   determining a plurality of constraints for a system in a first format, wherein at least one constraint of the plurality of constraints comprises a discrete constraint associated with a discrete variable; wherein the system is a physical system;
   converting the plurality of constraints in the first format into a set of formatted constraints in a second format, including converting the discrete constraint into a plurality of constraints in the second format comprising inequalities bounding a value of the discrete variable along a continuous segment between two integer values;
   determining a near feasible solution that satisfies a first subset of formatted constraints of the set of formatted constraints;
   determining a second subset of formatted constraints of the set of formatted constraints that are not satisfied by the near feasible solution;
   performing a shift of the near feasible solution in a direction determined based on the second subset of formatted constraints to a distance determined based on the first subset of formatted constraints and the second subset of formatted constraints;
   determining whether the shift results in any formatted constraints in the second subset of formatted constraints becoming satisfied;
   adding any formatted constraints in the second subset of formatted constraints that become satisfied after the shift to the first subset of formatted constraints;
   determining a best solution by performing an optimization technique on the near feasible solution based on the first subset of formatted constraints;
   converting the best solution of the first subset of formatted constraints in the second format into a best solution of the plurality of constraints in the first format; and
   implementing the best solution of the plurality of constraints in the first format within the system, wherein the best solution of the plurality of constraints in the first format is a control action to adjust operation of the system.

2. The method of claim 1, further comprising:
   performing the optimization technique on the near feasible solution with respect to a selected formatted constraint of the second subset of formatted constraints;

adding the selected formatted constraint to the first subset of formatted constraints if the selected formatted constraint is satisfied after performing the optimization technique; and removing the selected formatted constraint from the first subset of formatted constraints if the selected formatted constraint is not satisfied after performing the optimization technique.

3. The method of claim 1, wherein determining the near feasible solution comprises:

determining a set of highest priority formatted constraints;

determining an average direction solution based on an average direction of vectors representing the set of highest priority formatted constraints; and determining a number of unsatisfied constraints associated with the average direction solution.

4. The method of claim 3, wherein determining the near feasible solution further comprises:

calculating principal components of a matrix comprised of vectors representing the set of highest priority formatted constraints minus an average direction of the vectors representing the set of highest priority formatted constraints;

sorting the principal components by absolute value of an artificial resource allocation variable to determine a principal components solution; and determining a number of unsatisfied constraints associated with a shift from the near feasible solution in the direction of the principal components solution.

5. The method of claim 4, wherein determining the near feasible solution further comprises:

determining a prior known solution; and determining a number of unsatisfied constraints associated with the prior known solution.

6. The method of claim 5, wherein determining the near feasible solution further comprises:

determining a solution with a lowest number of bad constraints from the average direction solution, the principal components solution, and the prior known solution based on the number of unsatisfied constraints associated with the average direction solution, the number of unsatisfied constraints associated with the principal components solution, and the number of unsatisfied constraints associated with the prior known solution; and setting the near feasible solution as the solution with the lowest number of bad constraints.

7. The method of claim 1, wherein the optimization technique comprises a gradient ascent technique.

8. The method of claim 1, wherein:

the second format comprises form $\vec{a}'(i) * \vec{x}' \geq 0$, $\vec{a}(i)$ is a vector representing an ith constraints of the system, and $\vec{x}'$ is a vector representing a set of resource allocations for the system.

9. The method of claim 1, further comprising determining an integer value for the discrete variable based on a value of the discrete variable in the best solution in the second format being closer to one end of the continuous segment than the other end of the continuous segment.

10. The method of claim 1, wherein:

the system comprises an electrical grid control system, and the plurality of constraints comprise constraints associated with an electric grid controlled, at least in part, by the electrical grid control system.

11. A processing system, comprising:

a memory comprising computer-executable instructions;

a processor configured to execute the computer-executable instructions and cause the processing system to:

determine a plurality of constraints for a system in a first format, wherein at least one constraint of the plurality of constraints comprises a discrete constraint associated with a discrete variable; wherein the system is a physical system;

convert the plurality of constraints in the first format into a set of formatted constraints in a second format, including converting the discrete constraint into a plurality of constraints in the second format comprising inequalities bounding a value of the discrete variable along a continuous segment between two integer values;

determine a near feasible solution that satisfies a first subset of formatted constraints of the set of formatted constraints;

determine a second subset of formatted constraints of the set of formatted constraints that are not satisfied by the near feasible solution;

perform a shift of the near feasible solution with respect to all formatted constraints in the first subset of formatted constraints;

determine whether the shift results in any formatted constraints in the second subset of formatted constraints becoming satisfied;

add any formatted constraints in the second subset of formatted constraints that become satisfied after the shift to the first subset of formatted constraints;

determine an best solution by performing an optimization technique on the near feasible solution based on the first subset of formatted constraints;

convert the best solution of the first subset of formatted constraints into an best solution of the plurality of constraints in the first format; and implement the best solution of the plurality of constraints in the first format within the system, wherein the best solution of the plurality of constraints in the first format is a control action to adjust operation of the system.

12. The processing system of claim 11, wherein the processor is further configured to cause the processing system to:

perform the optimization technique on the near feasible solution with respect to a selected formatted constraint of the second subset of formatted constraints;

add the selected formatted constraint to the first subset of formatted constraints if the selected formatted constraint is satisfied after performing the optimization technique; and remove the selected formatted constraint from the second subset of formatted constraints if the selected formatted constraint is not satisfied after performing the optimization technique.

13. The processing system of claim 11, wherein in order to determine the near feasible solution, the processor is further configured to cause the processing system to:

determine a set of highest priority formatted constraints;

determine an average direction solution based on an average direction of vectors representing the set of highest priority formatted constraints; and determine a number of unsatisfied constraints associated with the average direction solution.

14. The processing system of claim 13, wherein in order to determine the near feasible solution, the processor is further configured to cause the processing system to:
  calculate principal components of a matrix comprised of vectors representing the set of highest priority formatted constraints minus an average direction of the vectors representing the set of highest priority formatted constraints;
  sort the principal components by absolute value of an artificial resource allocation variable to determine a principal components solution; and
  determine a number of unsatisfied constraints associated with the principal components solution.

15. The processing system of claim 14, wherein in order to determine the near feasible solution, the processor is further configured to cause the processing system to:
  determine a prior known solution; and
  determine a number of unsatisfied constraints associated with the prior known solution.

16. The processing system of claim 15, wherein in order to determine the near feasible solution, the processor is further configured to cause the processing system to:
  determine a solution with a lowest number of bad constraints from the average direction solution, the principal components solution, and the prior known solution based on the number of unsatisfied constraints associated with the average direction solution, the number of unsatisfied constraints associated with the principal components solution, and the number of unsatisfied constraints associated with the prior known solution; and
  set the near feasible solution as the solution with the lowest number of bad constraints.

17. The processing system of claim 11, wherein the optimization technique comprises a gradient ascent technique.

18. The processing system of claim 11, wherein:
  the second format comprises form $\vec{a}'(i) * \vec{x}' \geq 0$,
  $\vec{a}(i)$ is a vector representing an ith constraints of the system, and
  $\vec{x}'$ is a vector representing a set of resource allocations for the system.

19. The processing system of claim 11, wherein the processor is further configured to cause the processing system to determine an integer value for the discrete variable based on a value of the discrete variable in the best solution in the second format being closer to one end of the continuous segment than the other end of the continuous segment.

20. The processing system of claim 11, wherein:
  the system comprises an electrical grid control system, and
  the plurality of constraints comprise constraints associated with an electric grid controlled, at least in part, by the electrical grid control system.

* * * * *